US012605889B2

(12) United States Patent　　(10) Patent No.:　US 12,605,889 B2
Förster-Romswinckel et al.　　(45) Date of Patent:　Apr. 21, 2026

(54) MODULAR BUILD PLATFORMS FOR ADDITIVE MANUFACTURING

(71) Applicants:Cubicure GmbH, Vienna (AT); Align Technology, Inc., San Jose, CA (US)

(72) Inventors: Thomas Förster-Romswinckel, Pixendorf (AT); Robert Gmeiner, Vienna (AT); Otmar Martl, Linz (AT); Oliver Kesel, Pixendorf (AT); Bernhard Busetti, Vienna (AT); Markus Kury, Vienna (AT); Michael Christopher Cole, San Jose, CA (US); Peter Dorfinger, Woodside, CA (US); Shawn Stromenger, Milpitas, CA (US); Viswanath Meenakshisundaram, Santa Clara, CA (US); Lance Robert Pickens, Campbell, CA (US)

(73) Assignee: Align Technology, Inc., San Jose, CA (US)

( * ) Notice: Subject to any disclaimer, the term of this patent is extended or adjusted under 35 U.S.C. 154(b) by 37 days.

(21) Appl. No.: 18/472,100

(22) Filed: Sep. 21, 2023

(65) Prior Publication Data

US 2024/0100775 A1　　Mar. 28, 2024

Related U.S. Application Data

(60) Provisional application No. 63/376,718, filed on Sep. 22, 2022.

(51) Int. Cl.
*B29C 64/171*　　(2017.01)
*B29C 64/124*　　(2017.01)
(Continued)

(52) U.S. Cl.
CPC .......... *B29C 64/171* (2017.08); *B29C 64/124* (2017.08); *B29C 64/223* (2017.08);
(Continued)

(58) Field of Classification Search
CPC ..................................................... B29C 64/171
See application file for complete search history.

(56) References Cited

U.S. PATENT DOCUMENTS 6,210,162　B1　　4/2001　Chishti et al.
6,309,215　B1　　10/2001　Phan et al.
(Continued)

FOREIGN PATENT DOCUMENTS

CN　　　109795113　B　　6/2021
DE　　　29907262　U1　　7/1999
(Continued)

*Primary Examiner* — Timothy Kennedy
(74) *Attorney, Agent, or Firm* — FORTEM IP LLP

(57)　　　　　　　ABSTRACT

Systems, methods, and devices for additive manufacturing are provided. In some embodiments, a method includes: coupling a plurality of build platforms to a carrier; forming a plurality of 3D objects on the plurality of build platforms using an additive manufacturing process, where each build platform receives at least one 3D object thereon; removing the plurality of build platforms from the carrier; performing post-processing of the plurality of 3D objects while the 3D objects remain on the respective build platforms; and separating the plurality of 3D objects from the respective build platforms.

24 Claims, 17 Drawing Sheets

(51) Int. Cl.

| | |
|---|---|
| *B29C 64/223* | (2017.01) |
| *B29C 64/245* | (2017.01) |
| *B29C 64/379* | (2017.01) |
| *B29C 71/00* | (2006.01) |
| *B29C 71/02* | (2006.01) |
| *B29L 31/00* | (2006.01) |
| *B33Y 10/00* | (2015.01) |
| *B33Y 30/00* | (2015.01) |
| *B33Y 40/20* | (2020.01) |

(52) U.S. Cl.
CPC .......... *B29C 64/245* (2017.08); *B29C 64/379* (2017.08); *B29C 71/0009* (2013.01); *B29C 71/02* (2013.01); *B29C 2071/0027* (2013.01); *B29L 2031/753* (2013.01); *B33Y 10/00* (2014.12); *B33Y 30/00* (2014.12); *B33Y 40/20* (2020.01)

(56) References Cited

U.S. PATENT DOCUMENTS

| | | | |
|---|---|---|---|
| 6,450,807 | B1 | 9/2002 | Chishti et al. |
| 6,497,574 | B1 | 12/2002 | Miller |
| 6,749,414 | B1 | 6/2004 | Hanson et al. |
| 6,830,450 | B2 | 12/2004 | Knopp et al. |
| 6,957,118 | B2 | 10/2005 | Kopelman et al. |
| 6,976,627 | B1 | 12/2005 | Culp et al. |
| 7,092,784 | B1 | 8/2006 | Simkins |
| 7,192,273 | B2 | 3/2007 | McSurdy, Jr. |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |
| 7,384,266 | B2 | 6/2008 | Wen |
| 7,435,084 | B2 | 10/2008 | Liu et al. |
| 7,472,789 | B2 | 1/2009 | Wu et al. |
| 7,476,100 | B2 | 1/2009 | Kuo |
| 7,481,647 | B2 | 1/2009 | Sambu et al. |
| 7,604,181 | B2 | 10/2009 | Culp et al. |
| 7,641,828 | B2 | 1/2010 | DeSimone et al. |
| 7,648,360 | B2 | 1/2010 | Kuo |
| 7,674,422 | B2 | 3/2010 | Kuo |
| 7,711,447 | B2 | 5/2010 | Lu et al. |
| 7,748,199 | B2 | 7/2010 | Sankaran et al. |
| 7,802,987 | B1 | 9/2010 | Phan |
| 7,819,659 | B2 | 10/2010 | Wen |
| 7,831,322 | B2 | 11/2010 | Liu et al. |
| 7,840,373 | B2 | 11/2010 | Culp et al. |
| 7,892,474 | B2 | 2/2011 | Shkolnik et al. |
| 7,922,490 | B2 | 4/2011 | Wen |
| 7,957,824 | B2 | 6/2011 | Boronvinskih et al. |
| 8,019,465 | B2 | 9/2011 | Spiridonov et al. |
| 8,030,588 | B2 | 10/2011 | Culp et al. |
| 8,087,932 | B2 | 1/2012 | Liu |
| 8,636,513 | B2 | 1/2014 | Wen |
| 8,765,031 | B2 | 7/2014 | Li et al. |
| 8,776,391 | B1 | 7/2014 | Kaza et al. |
| 9,108,338 | B2 | 8/2015 | Sirovskiy et al. |
| 9,403,238 | B2 | 8/2016 | Culp |
| 9,700,385 | B2 | 7/2017 | Webber |
| 9,844,424 | B2 | 12/2017 | Wu et al. |
| 9,943,386 | B2 | 4/2018 | Webber et al. |
| 9,943,991 | B2 | 4/2018 | Tanugula et al. |
| 10,162,264 | B2 | 12/2018 | McLeod et al. |
| 10,162,624 | B1 | 12/2018 | Moturu et al. |
| 10,336,102 | B2 | 7/2019 | Cole |
| 10,495,973 | B2 | 12/2019 | Cole |
| 10,537,406 | B2 | 1/2020 | Wu et al. |
| 10,783,629 | B2 | 9/2020 | Parpara et al. |
| 10,806,546 | B2 | 10/2020 | Sirovskiy et al. |
| 10,888,395 | B2 | 1/2021 | Kopelman |
| 10,993,783 | B2 | 5/2021 | Wu et al. |
| 11,045,283 | B2 | 6/2021 | Riley et al. |
| 11,103,330 | B2 | 8/2021 | Webber et al. |
| 11,189,021 | B2 | 11/2021 | Shah et al. |
| 11,273,011 | B2 | 3/2022 | Shanjani et al. |
| 11,295,444 | B2 | 4/2022 | Cherkas et al. |
| 11,318,667 | B2 | 5/2022 | Mojdeh et al. |
| 11,370,173 | B2 | 6/2022 | Kelly et al. |
| 11,390,027 | B2 | 7/2022 | Lobovsky et al. |
| 11,420,362 | B2 | 8/2022 | Mojdeh et al. |
| 11,440,263 | B2 | 9/2022 | Gmeiner et al. |
| 11,511,485 | B2 | 11/2022 | Mojdeh et al. |
| 11,534,277 | B2 | 12/2022 | Chavez et al. |
| 11,554,000 | B2 | 1/2023 | Webber |
| 11,564,777 | B2 | 1/2023 | Kopelman et al. |
| 11,583,378 | B2 * | 2/2023 | Corey .................... A61C 19/02 |
| 11,596,502 | B2 | 3/2023 | Webber et al. |
| 11,602,413 | B2 | 3/2023 | Chen et al. |
| 11,638,627 | B2 * | 5/2023 | Corey ................... B33Y 10/00 433/8 |
| 11,666,415 | B2 | 6/2023 | Wang et al. |
| 11,793,606 | B2 | 10/2023 | Cam et al. |
| 2004/0243361 | A1 | 12/2004 | Steuben et al. |
| 2006/0093982 | A1 | 5/2006 | Wen |
| 2006/0093987 | A1 | 5/2006 | Wen |
| 2006/0093993 | A1 | 5/2006 | Wen |
| 2006/0127850 | A1 | 6/2006 | Wen |
| 2006/0127857 | A1 | 6/2006 | Liu et al. |
| 2006/0127858 | A1 | 6/2006 | Wen |
| 2006/0127859 | A1 | 6/2006 | Wen |
| 2006/0127860 | A1 | 6/2006 | Wen |
| 2006/0172250 | A1 | 8/2006 | Wen |
| 2006/0199145 | A1 | 9/2006 | Liu et al. |
| 2007/0092853 | A1 | 4/2007 | Liu et al. |
| 2007/0243502 | A1 | 10/2007 | Wen |
| 2008/0083348 | A1 | 4/2008 | Kuo et al. |
| 2009/0148814 | A1 | 6/2009 | Li et al. |
| 2014/0061974 | A1 | 3/2014 | Tyler |
| 2014/0265034 | A1 | 9/2014 | Dudley |
| 2015/0097315 | A1 | 4/2015 | DeSimone et al. |
| 2017/0135793 | A1 | 5/2017 | Webber et al. |
| 2017/0165916 | A1 * | 6/2017 | El-Siblani ............. B29C 33/448 |
| 2018/0000570 | A1 | 1/2018 | Sun et al. |
| 2018/0134029 | A1 | 5/2018 | Myerberg et al. |
| 2018/0141268 | A1 | 5/2018 | Holt |
| 2018/0263730 | A1 * | 9/2018 | Sirovskiy ................. A61C 7/08 |
| 2019/0046297 | A1 | 2/2019 | Kopelman et al. |
| 2019/0090995 | A1 | 3/2019 | Ruppert et al. |
| 2019/0105839 | A1 | 4/2019 | Hicks et al. |
| 2019/0298494 | A1 | 10/2019 | Webber et al. |
| 2020/0023581 | A1 | 1/2020 | Markwalder et al. |
| 2020/0238615 | A1 * | 7/2020 | Staal ..................... B29C 64/245 |
| 2020/0290262 | A1 | 9/2020 | Aguilar Mendez et al. |
| 2020/0290275 | A1 * | 9/2020 | Dubelman ............ B29C 64/236 |
| 2021/0030516 | A1 | 2/2021 | O'Leary et al. |
| 2021/0146619 | A1 | 5/2021 | Shusteff et al. |
| 2021/0178639 | A1 * | 6/2021 | Lukacs .............. A61C 13/0027 |
| 2021/0187859 | A1 * | 6/2021 | Gmeiner ................ B33Y 30/00 |
| 2021/0259809 | A1 | 8/2021 | O'Leary et al. |
| 2022/0203616 | A1 * | 6/2022 | Korten ................... B33Y 30/00 |
| 2022/0227051 | A1 | 7/2022 | Regehly |
| 2022/0258420 | A1 | 8/2022 | Märklin |
| 2023/0294354 | A1 | 9/2023 | Gmeiner et al. |
| 2023/0311410 | A1 * | 10/2023 | Korten .................. B29C 64/171 264/401 |

FOREIGN PATENT DOCUMENTS

| | | |
|---|---|---|
| DE | 102018116314 A1 | 1/2020 |
| EP | 2956823 B1 | 6/2016 |
| EP | 3418033 A1 | 12/2018 |
| WO | 2015075094 A1 | 5/2015 |
| WO | 2016078838 A1 | 5/2016 |
| WO | 2017051029 A1 | 3/2017 |
| WO | 2017115076 A1 | 7/2017 |
| WO | 2018032022 A1 | 2/2018 |
| WO | 2018170422 A1 | 9/2018 |
| WO | 2018226164 A2 | 12/2018 |
| WO | 2020070639 A1 | 4/2020 |
| WO | 2020245456 A1 | 12/2020 |
| WO | 2021040898 A1 | 3/2021 |

(56) References Cited

FOREIGN PATENT DOCUMENTS

| | | | |
|---|---|---|---|
| WO | 2021087061 | A2 | 5/2021 |
| WO | 2021130654 | A1 | 7/2021 |
| WO | 2021130657 | A1 | 7/2021 |
| WO | 2021130661 | A1 | 7/2021 |
| WO | 2022011456 | A1 | 1/2022 |

* cited by examiner

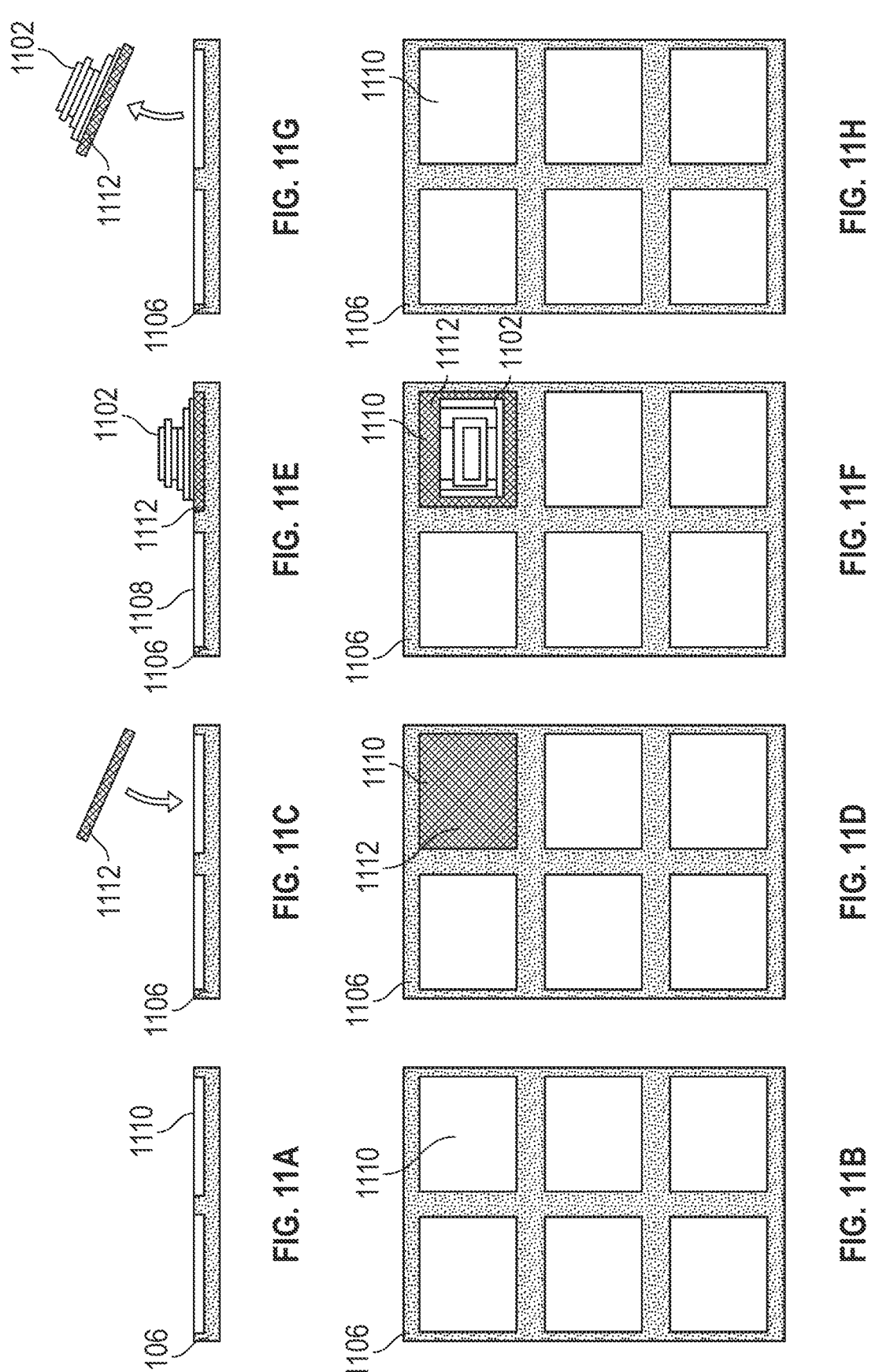

1300

1302
Couple a plurality of build
platforms to a carrier

1304
Form a plurality of objects on the plurality of build
platforms using an additive manufacturing process 1306
Remove the plurality of build
platforms from the carrier 1308
Perform post-processing of
the plurality of objects 1310
Separate the plurality of objects from the
respective build platforms

Figure 14:
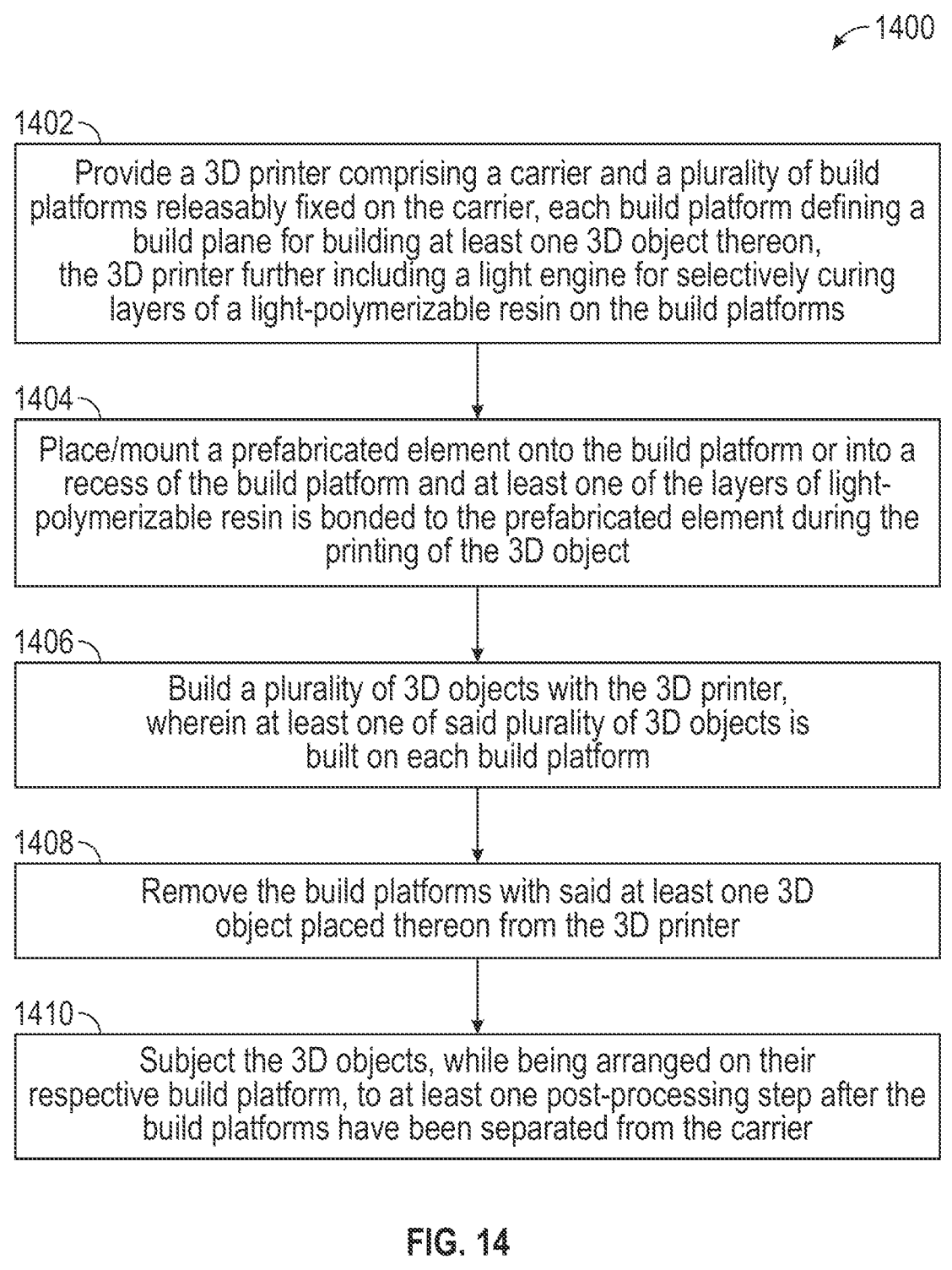

1400

1402

Provide a 3D printer comprising a carrier and a plurality of build platforms releasably fixed on the carrier, each build platform defining a build plane for building at least one 3D object thereon, the 3D printer further including a light engine for selectively curing layers of a light-polymerizable resin on the build platforms

1404

Place/mount a prefabricated element onto the build platform or into a recess of the build platform and at least one of the layers of light-polymerizable resin is bonded to the prefabricated element during the printing of the 3D object

1406

Build a plurality of 3D objects with the 3D printer, wherein at least one of said plurality of 3D objects is built on each build platform

1408

Remove the build platforms with said at least one 3D object placed thereon from the 3D printer

1410

Subject the 3D objects, while being arranged on their respective build platform, to at least one post-processing step after the build platforms have been separated from the carrier

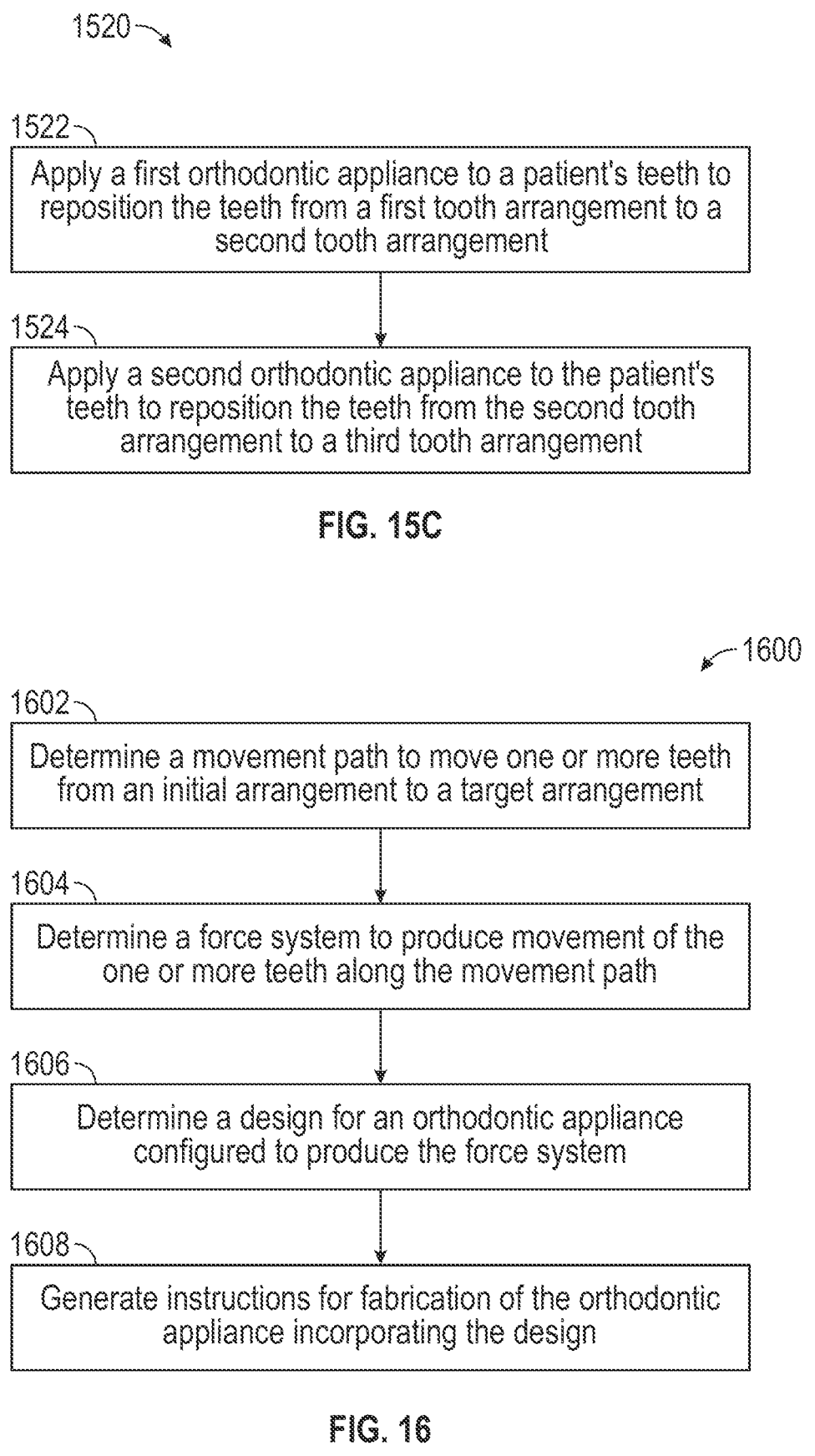

| Apply a first orthodontic appliance to a patient's teeth to reposition the teeth from a first tooth arrangement to a second tooth arrangement |
| --- |

1524 ⟍

| Apply a second orthodontic appliance to the patient's teeth to reposition the teeth from the second tooth arrangement to a third tooth arrangement |
| --- |

| Determine a movement path to move one or more teeth from an initial arrangement to a target arrangement |
| --- |

1604 ⟍

| Determine a force system to produce movement of the one or more teeth along the movement path |
| --- |

1606 ⟍

| Determine a design for an orthodontic appliance configured to produce the force system |
| --- |

1608 ⟍

| Generate instructions for fabrication of the orthodontic appliance incorporating the design |
| --- |

FIG. 16

MODULAR BUILD PLATFORMS FOR ADDITIVE MANUFACTURING

CROSS-REFERENCE TO RELATED APPLICATION(S)

The present application claims the benefit of priority to U.S. Provisional Application No. 63/376,718, filed Sep. 22, 2022, which is incorporated by reference herein in its entirety.

TECHNICAL FIELD

The present technology generally relates to manufacturing, and in particular, to modular build platforms for additive manufacturing.

BACKGROUND

Additive manufacturing encompasses a variety of technologies that involve building up three-dimensional (3D) objects from multiple layers of material. Lithography-based additive manufacturing techniques generally involve curing a photoreactive resin by selectively exposing the resin to electromagnetic radiation, thereby forming a solid layer of cured material. This process can be repeated to build up a 3D object in a layer-by-layer manner. 3D objects that have been printed using lithography-based additive manufacturing techniques are typically subjected to finishing and post-processing steps. Usually, the printed objects are removed from the 3D printer together with the build platform onto which the objects are adhered, and the build platform serves as an aid for supporting and manipulating the objects during the finishing and post-processing steps. Although increasing the size of the build platform can increase the throughput of the additive manufacturing process by allowing more objects to be printed simultaneously, it may be challenging to use larger build platforms to support the objects during finishing and post-processing.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

FIGS. 11A and 11B are side and top views, respectively, of a build platform including empty recesses in accordance with embodiments of the present technology.

FIGS. 11C and 11D are side and top views, respectively, showing placement of a prefabricated element into the recess of the build platform, in accordance with embodiments of the present technology.

FIGS. 11E and 11F are side and top views, respectively, showing a 3D object printed onto the prefabricated element in the build platform, in accordance with embodiments of the present technology.

FIGS. 11G and 11H are side and top views, respectively, showing removal of the final structure from the build platform, in accordance with embodiments of the present technology.

FIG. 14 is a flow diagram illustrating a method for fabricating additively manufactured objects, in accordance with embodiments of the present technology.

FIG. 15C illustrates a method of orthodontic treatment using a plurality of appliances, in accordance with embodiments of the present technology.

FIG. 16 illustrates a method for designing an orthodontic appliance, in accordance with embodiments of the present technology.

DETAILED DESCRIPTION

I. Overview of Technology

Figure 1:
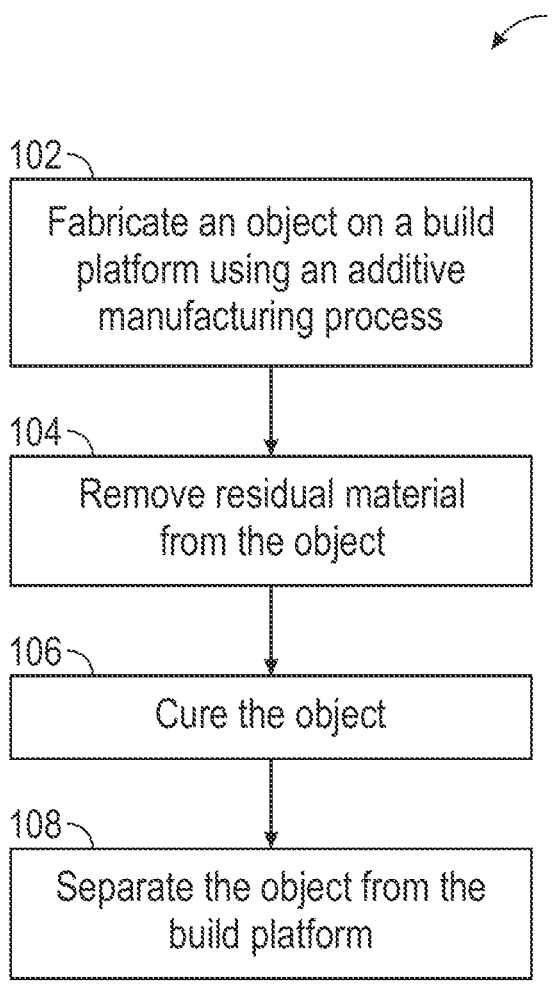
FIG. 1 is a flow diagram providing a general overview of a method for fabricating and post-processing an additively manufactured object, in accordance with embodiments of the present technology.

The present technology relates to additive manufacturing of objects, such as dental appliances. In some embodiments, for example, a method for manufacturing a plurality of objects includes coupling a plurality of build platforms to a carrier, then forming a plurality of objects on the plurality of build platforms using an additive manufacturing process, where each build platform receives at least one object thereon during the additive manufacturing process. For instance, the additive manufacturing process can involve applying energy (e.g., light) to a curable material (e.g., a polymerizable resin) to build up the objects from a plurality of cured material layers. The method can further include removing the plurality of build platforms from the carrier, after the additive manufacturing process is complete. The method can also include performing post-processing of the plurality of objects while the objects remain on the respective build platforms, such as removing excess curable material from the objects and/or applying energy to the objects to cause additional curing. The method can include separating the plurality of objects from the respective build platforms after the post-processing.

The present technology can provide various advantages compared to conventional additive manufacturing techniques. For instance, the use of modular build platforms that can be individually coupled and decoupled from a carrier allows multiple build platforms to be assembled to form a single build substrate with a larger build area for printing, which may be advantageous for producing a larger number of objects in a single printing operation and/or may be needed to accommodate certain types of additive manufacturing systems and processes. The build platforms can subsequently be removed from the carrier along with their respective objects, and may serve as a support for handling the objects during post-processing operations. The individual build platforms can be sufficiently small to be placed within post-processing devices (e.g., centrifuges, solvent baths, post-curing ovens) that are not capable of accommodating larger build platforms. The modular nature of the build platforms also allows for replacement of individual build platforms if a particular build platform becomes damaged or fouled, and also allows the type, geometry, and/or arrangement of the build platforms to be customized to accommodate different sizes, shapes, and/or arrangements of objects to be printed.

In some embodiments, 3D objects that have been printed via a lithography-based additive manufacturing method may be subjected to finishing and/or post-processing steps, such as removing uncured resin adhering to the object, removing support structures from the 3D printed objects, removing the 3D printed objects from the build platform (e.g., via a blade or other removal mechanism), and/or post-curing 3D objects via energy (e.g., UV light or heat-induced curing), in order to reach the objects' final specifications. Usually, the printed objects are removed from the additive manufacturing system together with the build platform onto which the objects are adhered. The build platform can be used as a carrier for supporting, handling, and/or manipulating the objects during the finishing and/or post-processing steps. However, it may be challenging to use larger build platforms as a carrier for the 3D printed objects during finishing and post-processing steps.

Therefore, it is an object of the present technology to improve lithography-based additive manufacturing methods so as to facilitate finishing and postprocessing steps in cases where a relatively large build platform is used. In some embodiments, the present technology provides a method of producing a plurality of 3D objects by lithography-based additive manufacturing. Further, the present technology can provide a 3D printer for carrying out this method.

The present technology in a first aspect thereof provides a method of producing a plurality of 3D objects by lithography-based additive manufacturing, comprising:

proviThe present technology in a first aspect thereof provides a method of producing a plurality of 3D objects by lithography-based additive manufacturing, comprising:
    providing a 3D printer comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms;
    building a plurality of 3D objects with the 3D printer, wherein at least one of said plurality of 3D objects is built on each build platform;
    removing the build platforms with said at least one 3D object placed thereon from the 3D printer; and
    subjecting the 3D objects, while being arranged on their respective build platform, to at least one post-processing step after the build platforms have been separated from the carrier.

Thus, this present technology is based on the idea to divide a large build platform into a plurality of smaller build platforms that are releasably fixed on a carrier. Due to their smaller size, each build platform can be easier to handle, and the individual build platforms can be handled separately from each other for subjecting the objects thereon to post-processing steps. Further, using a plurality of smaller build platforms instead of a single platform allows an even larger building area than in conventional approaches. Using a plurality of smaller build platforms can also provide a modular system, in which the size, arrangement and/or number of build platforms may be adapted to the requirements of the specific print job.

The build platforms may be removed from the 3D printer together with the carrier or after having been separated from the carrier. If the build platforms are removed from the 3D printer while still fixed to the carrier, the build platforms can be separated from the carrier before subjecting the 3D objects to the at least one post-processing step. In any case, for carrying out the at least one post-processing step, the build platforms may have been removed and be separated from the carrier. Removing the build platforms from the carrier may be undertaken manually or automatically. In the automatic embodiment, the 3D printer may comprise releasing means for releasing a holding force, such as, e.g., a magnetic or mechanical holding force.

Each build platform from the plurality of build platforms carries at least one 3D object. In some embodiments, a plurality of 3D objects is built on each build platform, such as five or more, 10 or more, or 20 or more objects.

The carrier may hold at least two build platforms. In some embodiments, a larger number of build platforms is releasably fixed on the carrier, such as three, four, or more build platforms, 20 or more build platforms, or 50 or more build platforms.

In some embodiments, the plurality of build platforms are arranged on the carrier to cover an area of at least 2000 cm$^2$, such as at least 2500 cm$^2$. In some instances, a single build platform having a size of, e.g., 100 cm×30 cm, or 150 cm×50 cm, does not easily fit in, e.g., centrifuges, solvent cleaning devices, or UV or thermal furnaces. Therefore, the segmentation of a large build platform into smaller segments that are easier to handle can be a straightforward way to facilitate the subsequent post-processing steps after printing is finished.

The build platforms may all have the same size and be arranged in a regular grid. Alternatively, the build platforms may have different sizes and shapes. The build platforms may be made of any kind of material that has a sufficient stiffness so as to be inherently stable to support the 3D objects printed thereon and to be handled during the post-processing steps. Suitable materials include metal, ceramic, glass, wood, or paper. For example, a simple sheet metal plate may be used as a build platform. Suitable metals are, for example, aluminum or steel. Further, the build platforms may have different surface finishes or a rough pattern, which can promote the adhesion of the 3D object onto the build platform.

In some embodiments, the build platforms may have recesses, such as holes, drills, hollows, or gaps, which can promote resin to flow through or in said recesses. In some cases, the resin flowing through said recesses can be collected below the build platforms to be reused in a later printing job.

In some embodiments, the build platforms may be cooled. In other embodiments, the build platforms may be heated. The build platforms may be heated to a surface temperature at the build plane of 20° C. to 200° C., such as 30° C. to 90° C.

The build platforms can be releasably fixable on the carrier so that, on the one hand, their position on the carrier can reliably be kept stable during the printing process, and that, on the other hand, they may easily be detached from the carrier upon completion of the printing process. The build platforms may be releasably fixed to the carrier by means of mechanical clamping, electromagnetic forces, magnetic forces, vacuum, and/or a form-fit engagement. By being releasably fixable to the carrier, the build platforms can constitute exchangeable parts that may be reused for a plurality of production cycles.

In some embodiments, the build platforms are arranged and fixable on the carrier so as to provide a build plane that is common to all build platforms.

Due to the modular system provided by the use of a plurality of exchangeable build platforms, the build platforms may advantageously be adapted to the footprint of the one or the plurality of 3D objects to be printed onto the respective build platform.

In some embodiments, prefabricated elements can be fixed on and/or attached to one or more build platforms. Said fixed or attached prefabricated elements can then be manipulated by printing, e.g., on their surfaces.

The method of the present technology may be carried out by stereolithography manufacturing principles, e.g., by using 3D printers comprising a light engine for selectively curing layers of a light-polymerizable resin on the plurality of build platforms.

As used herein, "light" may include any electromagnetic radiation that is able to induce polymerization of a light-polymerizable resin. The term "light" needs not be restricted to visible light, e.g., the portion of the spectrum that can be perceived by the human eye. The radiation may have a wavelength in the range of 10 nm to 10,000 nm, such as 100 nm to 500 nm.

The term "light-polymerizable resin" may refer to a material that conforms into a hardened polymeric material through a curing process. A light-polymerizable resin may include, but is not limited to, a mixture of monomers, oligomers, and photoinitiators. A light-polymerizable resin may also be referred to as an uncured photopolymer.

Typically, a light-polymerizable resin may include (e.g., consist of) optionally at least one (reactive) oligomer, optionally at least one (reactive) diluent, at least one photoinitiator, optionally additives, and/or optionally fillers. Reactive groups may be unsaturated chemical bonds or cyclic chemical structures. Examples of reactive groups include alkenes, alkynes, vinyl compounds, (meth)acrylates, acrylamides, allyl compounds, norbornene, vinyl ethers, vinyl esters, epoxides, oxetanes, maleimides, thiols, and so forth. Oligomers may be optionally reactive group-functionalized and may comprise all kinds of polymerisates, polycondensation and polyaddition products, e.g., epoxies, polyesters, polyurethanes, copolymers, homopolymers, polyamides, polycarbonates, polythioethers, polythioesters, silicones, and many more. Reactive diluents may be monofunctional or multifunctional low molecular weight reactive monomers that serve as a reactive solvent in order to adjust process viscosity of the photoreactive resins and mechanical properties of the final photopolymer. Additives may include defoamers, wetting agents, leveling agents, flame retardants, UV stabilizers, UV absorbers, IR absorbers, thermal stabilizers, and/or thermal initiators. Examples for fillers may include metals, metallic alloys, ceramics, glass, polymers, natural fabrics, salts, and many more. Photoinitiators may form reactive species when exposed to radiation of certain wavelength(s) that trigger off the polymerization. Typical reactive species include radicals, cations, anions, or activated catalytic species. Photoinitiators can also act in combination with catalysts, coinitiators, and/or sensitizers.

"Curing" the light-polymerizable resin may be a process, wherein the light-polymerizable resin is polymerized or cross-linked as a result of being irradiated by light.

As used herein, a "light engine" may be a device that is able to generate dynamic light information according to a predetermined pattern. As an example, liquid crystal displays, digital light processing, other active mask projection systems, and/or laser-scanner based systems may be used to selectively project light information on the surface of the light-polymerizable resin.

According to some embodiments of the present technology, the post-processing step is selected from removing uncured resin (e.g., by centrifuging the 3D object), washing the 3D object with fluids, removing solvents from the 3D object, subjecting the 3D object to pressurized air, drying the 3D object, removing support structures from the 3D object, removing the 3D object from the build platform, post-curing the 3D object by means of UV light, and/or heat-curing and/or microwave-curing the 3D object. In some embodiments, dual cure systems utilize at least one subsequent activation step (e.g., heat or microwave) after 3D printing to trigger off a second reaction to reach the final desired material properties.

In order to facilitate the separation of the 3D object from the build platform after the post-processing step, an interface layer may each be arranged on the build platforms, on top of which the 3D objects are built, wherein the at least one post-processing step comprises destabilizing, eliminating, or removing the interface layer, thereby causing the 3D object to be detached from the build platform. Removing or destabilizing the interface layer may comprise subjecting the interface layer to a physical and/or chemical process that causes the interface layer to disintegrate or lose its stability, such as by means of dissolving, etching, melting, or other chemical or physical means.

As to the nature of the interface layer, any material may be used that differs from the cured light-polymerizable resin in at least one physical and/or chemical property, such as the melting point, the solubility, the boiling point, etc. In some embodiments, the interface layer is made from a material that is polymerizable and, in its polymerized and pre-polymerized state, can be dissolved or swollen in a solvent. Such a material may therefore include (e.g., consist of) at least one polymerizable group, such as acrylates, methacrylates, acrylamides, vinyl ethers, vinyl esters, maleimides, cyclic ethers, isocyanates, amines, or other polymerizable unsaturated or saturated groups, and may optionally further comprise at least one hydrophilic or oleophilic group. The polymerized material may be dissolvable or swellable in a solvent, such as water, alcohol, oil, or other organic solvents. Such materials, for example, may comprise hydroxyl, carbonyl, and/or carboxyl groups, and/or derivatives with other electronegative hetero atoms, amines, ionic liquids and salts, for example, hydroxyethylacrylate (HEA), hydroxyethylmethacrylate (HEMA), 2-(2-ethoxyethoxy)ethyl acrylate (EOEOEA), acryloyl morpholine (ACMO), polyethylene glycol derivates, polyethers, hydroxy ethylene, or lauryl acrylates. The interface layer may be applied by a spray coating.

Alternatively, a film may each be arranged on the build platforms and the 3D objects are built on top of the film, and wherein the at least one post-processing step comprises peeling the film off from the build platform, thereby detaching the 3D object from the build platform.

In order to integrate prefabricated elements into the 3D printed object, some embodiments provide that, before printing the 3D object, a prefabricated element is placed and/or mounted onto the build platform or into a recess of the build platform and at least one of the layers of light-polymerizable resin is bonded to the prefabricated element during the printing of the 3D object. The prefabricated element can be made of a material that is different from the light-polymerizable resin. In this way multi-material combinations are possible. Further, a combination of parts may be realized that cannot be printed in the same process.

In accordance with lithography-based additive manufacturing methods, the 3D object can be built on the building platform layer-by-layer to obtain a stack of structured layers, wherein each structured layer is obtained by the steps of:

providing an unstructured layer of light-polymerizable resin; and selectively projecting light onto the unstructured layer according to a desired pattern, thereby curing the light-polymerizable resin to obtain the structured layer that is structured according to the pattern.

The use of a plurality of smaller build platforms instead of a single, larger platform is particularly useful in a 3D printing method disclosed in International Publication Nos. WO 2021/130654, WO 2021/130657, and WO 2021/130661, which may be characterized by a significantly larger build area than in conventional embodiments. Therefore, some embodiments of the present technology provide that at least one of the light engine and the carrier is driven for relative movement to one another while selectively curing a layer of the light-polymerizable resin, so that an exposure field of the light engine sweeps across said plurality of build platforms.

In some embodiments, the light engine is configured for the dynamic patterning of light in the exposure field of said light engine, wherein pattern data is fed to the light engine so that a light pattern is scrolled in the exposure field at a rate that corresponds to the relative movement speed of the light engine and the carrier.

According to a second aspect, the present technology provides a 3D printer for carrying out a method according to the first aspect of the present technology, comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms.

In some embodiments, fixing means are provided for fixing the position and/or orientation of the build platforms on the carrier, the fixing means being selected from mechanical clamping means, electromagnetic holding means, magnetic holding means, vacuum means, and form-fit engagement means.

In some embodiments, the carrier comprises means for collecting excess resin that might drop through the gaps between neighboring build platforms. The excess resin may be collected in a suitable vessel, wherein the collected material may be recycled for being reused in another printing process.

In some embodiments, the build platforms and/or the carrier may be equipped with machine-readable identification means, such as RFID chips or engraved patterns readable by a camera system, in order that the individual build platforms can be automatically identified.

In some embodiments, at least one of the light engine and the carrier is driven for relative movement to one another while selectively curing a layer of the light-polymerizable resin, for an exposure field of the light engine to sweep across said plurality of build platforms.

According to some embodiments, the printer may comprise means for applying an unstructured layer of light-polymerizable resin onto the build platform or on the partially built object, wherein the light engine is designed for the patterning of light onto the unstructured layer of light-polymerizable resin, the light engine being adapted to cure the light-polymerizable resin to obtain the structured layer that is structured according to the pattern.

In some embodiments, the light engine is designed for the dynamic patterning of light in the exposure field of said light engine, wherein pattern data is fed to the light engine so that a light pattern is scrolled in the exposure field at a rate that corresponds to the relative movement speed of the light engine and the carrier.

The present technology may be used for manufacturing various types of 3D objects. Examples for applications of 3D printed objects include electronics, electric and electromechanic components, connectors, housings, automobile and aerospace sectors, electric mobility, communication technology, computer technology, military technology, medical devices, medical technology, consumer goods, sports industry, energy industry, printed electronics, and dental and orthodontic applications. Orthodontic applications comprise, without limitations, aligners, retainers, brackets and wires, whitening trays, mouth trays and guards, aligners for drug delivery, aligners for the detection of substances, night guards, anti-bruxing or anti-grinding devices, tongue thrust devices, palatal expanders, oral appliance therapy for treatment of malocclusion, sleep apnea, anti-snoring devices, attachment templates, mandibular advancement devices, prefabricated attachment templates, etc., each of which includes the methods and processes for these purposes.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," "lower," "left," and "right" can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

II. Modular Build Platforms for Additive Manufacturing

A. Additive Manufacturing Technology

FIG. 1 is a flow diagram providing a general overview of a method 100 for fabricating and post-processing an additively manufactured object, in accordance with embodiments of the present technology. The method 100 can be used to produce many different types of additively manufactured objects, such as orthodontic appliances (e.g., aligners, palatal expanders, retainers, attachment placement devices, attachments), restorative objects (e.g., crowns, veneers, implants), and/or other dental appliances and devices (e.g., oral sleep apnea appliances, mouth guards). Additional examples of dental appliances and associated methods that are applicable to the present technology are described in Section III below.

The method 100 begins at block 102 with fabricating an object on a build platform using an additive manufacturing process. Additive manufacturing (also referred to herein as "3D printing") includes a variety of technologies which fabricate 3D objects directly from digital models through an additive process. In some embodiments, additive manufacturing includes depositing a precursor material onto a build platform. The build platform can be one of a plurality of modular build platforms that are releasably coupled to a carrier, as described in Section II.B below. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

The additive manufacturing process can implement any suitable technique known to those of skill in the art. Examples of additive manufacturing techniques include, but are not limited to, the following: (1) vat photopolymerization, in which an object is constructed from a vat of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn though a nozzle, heated, and deposited layer-by-layer, such as fused deposition modeling (FDM) and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using a vat photopolymerization process in which light is used to selectively cure a vat or reservoir of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the vat, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Publication Nos.

2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous 3D path in order to form the object. Such methods are described in U.S. Pat. No. 10,162,624 and U.S. Patent Publication No. 2014/0061974, the disclosure of which is incorporated herein by reference in its entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Pat. No. 10,162,264 and U.S. Patent Publication No. 2014/0265034, the disclosures of which are incorporated herein by reference in their entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting holographic light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the additively manufactured object can be fabricated using a powder bed fusion process (e.g., selective laser sintering) involving using a laser beam to selectively fuse a layer of powdered material according to a desired cross-sectional shape in order to build up the object geometry. As another example, the additively manufactured object can be fabricated using a material extrusion process (e.g., fused deposition modeling) involving selectively depositing a thin filament of material (e.g., thermoplastic polymer) in a layer-by-layer manner in order to form an object. In yet another example, the additively manufactured object can be fabricated using a material jetting process involving jetting or extruding one or more materials onto a build surface in order to form successive layers of the object geometry.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid state at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the fabrication methods herein, then a second portion of the object can be formed from a second material in accordance with any of the fabrication methods herein, and so on, until the entirety of the object has been formed.

After the additively manufactured object is fabricated, the object can undergo one or more additional process steps, also referred to herein as "post-processing." As described in detail below with respect to blocks 104-108, post-processing can include removing residual material from the object, curing the object, and/or separating the object from the build platform.

For example, at block 104, the method 100 continues with removing residual material from the object. The residual material can include excess precursor material (e.g., uncured resin) and/or other unwanted material (e.g., debris) that remains on or within the object after the additive manufacturing process. The residual material can be removed in many different ways, such as by exposing the object to a solvent (e.g., via spraying, immersion), heating or cooling the object, applying a vacuum to the object, blowing a pressurized gas onto the object, applying mechanical forces to the object (e.g., vibration, agitation, centrifugation, tumbling, brushing), and/or other suitable techniques. Optionally, the residual material can be collected and/or processed for reuse.

At block 106, the method 100 can optionally include curing the object. This additional curing step (also known as "post-curing") can be used in situations where the object is still in a partially cured "green" state after fabrication. For example, the energy used to fabricate the object in block 102 may only partially polymerize the precursor material forming the object. Accordingly, the post-curing step may be needed to fully cure (e.g., fully polymerize) the object to its final, usable state. Post-curing can provide various benefits, such as improving the mechanical properties (e.g., stiffness, strength) and/or temperature stability of the object. Post-curing can be performed by heating the object, applying radiation (e.g., UV, visible, microwave) to the object, or suitable combinations thereof. In other embodiments, however, the post-curing process of block 106 is optional and can be omitted.

At block 108, the method 100 can include separating the object from the build platform. The build platform can mechanically support the object during the additive manufacturing and/or the post-processing steps described herein. In some embodiments, the build platform is coupled to a carrier during additive manufacturing, and is removed from the carrier during post-processing. Additional details and examples of build platforms that may be used in the method 100 are described in Section MB below.

The method 100 illustrated in FIG. 1 can be modified in many different ways. For example, although the above steps of the method 100 are described with respect to a single object, the method 100 can be used to sequentially or concurrently fabricate and post-process any suitable number of objects, such as tens, hundreds, or thousands of additively manufactured objects. As another example, the ordering of the processes shown in FIG. 1 can be varied (e.g., the process of block 108 can be performed before and/or concurrently with the processes of blocks 104 and/or 106). Some of the processes of the method 100 can be omitted, such as the process of block 106.

Additionally, the method 100 can include processes not shown in FIG. 1, such as cleaning the object (e.g., washing), annealing, trimming the object to remove structures that are not intended to be present in the final product (e.g., residual parts of the support structures), and/or packaging the object for shipment. Optionally, the method 100 can include modifying at least one surface of the object. The surface modifications can be applied to some or all of the surfaces of the object (e.g., the exterior and/or interior surfaces) to alter one or more surface characteristics, such as the surface finish (e.g., roughness, waviness, lay), porosity, visual appearance (e.g., gloss, transparency, visibility of print lines), hydrophobicity, and/or chemical reactivity. In some embodiments, the surface modifications include removing material from the object, e.g., by polishing, abrading, blasting, etc. Alternatively or in combination, the surface modifications can include applying an additional material to the object. For example, the additional material can be a coating, such as a polymeric coating. The coating can be applied to one or more surfaces of the object for various purposes, including, but not limited to: providing a smooth surface finish, which can be beneficial for aesthetics and/or to improve user comfort if the object is intended to be in contact with the user's body (e.g., an orthodontic appliance worn on the teeth); coloring and/or applying other aesthetic features to the object; improving scratch resistance and/or other mechanical properties; providing antimicrobial properties; and incorporating therapeutic agents into the object for controlled release.

In some embodiments, the present technology utilizes a lithography-based additive manufacturing process. Lithography-based additive manufacturing generally refers to methods in which a curable material (e.g., a photoreactive resin) is selectively exposed to energy (e.g., electromagnetic radiation) and cures upon exposure to the energy, thereby forming a solid layer of cured material. In some embodiments, the very first layer adheres to a build platform and shows sufficient bonding during the manufacturing process to support the rest of the object. Subsequent layers of cured material are repeatedly added upon the already cured layer, thus generating a 3D object. Examples of lithography-based additive manufacturing processes include SLA, DLP, liquid crystal display (LCD) printing, two-photon polymerization (2PP) (also known as two-photon induced polymerization (TPIP)), inkjet printing (e.g., MultiJet printing), volumetric 3D printing, and other suitable radiation-curable technologies, as well as their combinations and/or combinations of other manufacturing approaches. Compared to other additive manufacturing technologies, lithography-based additive manufacturing process can yield geometrically complex, highly resolved objects with exceptional surface finish.

Traditional lithography-based additive manufacturing processes use large photopolymer resin vats, in which a build platform and the layers of the object already printed on the build platform are submerged during the printing process. In these systems, new layers are added on top of each other at the surface of the liquid resin bath. Various light sources are typically used in order to induce photopolymerization of the liquid photopolymer resin layer. As an example, DLP, other active mask projection systems, and/or laser-scanner based systems may be used to selectively project light information on the surface of the photopolymer resin. These printing concepts advantageously allow use of large resin vats and often result in large building areas.

However, generating a thin layer of resin between a submerged structure and the free surface of the liquid resin bath may be limited in accuracy (e.g., regarding the liquid layer thickness) due to a variety of factors, including the viscosity and/or surface tension phenomena of the resin formulation used. Further, feature accuracy is typically limited when large building areas are used, even if laser-scanner based systems are used. Optical limitations of the scanner lens construction, timing limitations of the traditionally used pulse laser sources, and/or large deviation angles of the scanning field may result in accuracy limitations of the whole printing process, and/or accuracy shifts between the center and the edge of the building area. Another issue is the need for significant amounts of photopolymer material before a printing job can be started (e.g., vat filling procedure). As photopolymer resins can become chemically unstable, resin storage and degradation as well as cleaning a large resin vat can become an economical problem and limits the process stability over time.

Some lithography-based approaches use vat-based concepts, where a liquid resin is filled into a transparent material vat. According to these approaches, a layer of the liquid resin is irradiated by selective light information from below, e.g., through the bottom of the material vat, so that the printed components are generated upside-down, sticking to a so-called build platform. These systems present some advantages, such as the possibility of mechanically adjusting the resin layer height by lowering the building platform into the resin vat. By doing so, layers of resin with desired thicknesses (e.g., thin layers of resin) and/or products with features of desired resolutions (e.g., products with high feature resolution have become possible.

Further, with certain process adaptions like heating or thin film coating (see, e.g., European Patent No. EP3284583 and European Patent No. EP3418033, the disclosures of which are incorporated by reference herein in their entirety), highly viscous materials (e.g., resins) can be printed, which may not be capable of processing with any other additive manufacturing technique. Highly viscous materials can lead to advanced mechanical properties of parts printed with stereolithography. Dynamic lithography-based manufacturing technologies have massively increased the available build area and consequently significantly increased the production rate of small, highly resolved objects. These novel technologies are based on a light engine that is driven to travel across a large build platform while depositing a layer of light-polymerizable resin by means of an endless carrier foil and curing said layer. Examples of such technologies are provided in International Publication Nos. WO 2021/130654, WO 2021/130657, and WO 2021/130661, the disclosures of which are incorporated by reference herein in their entirety.

Figure 2:
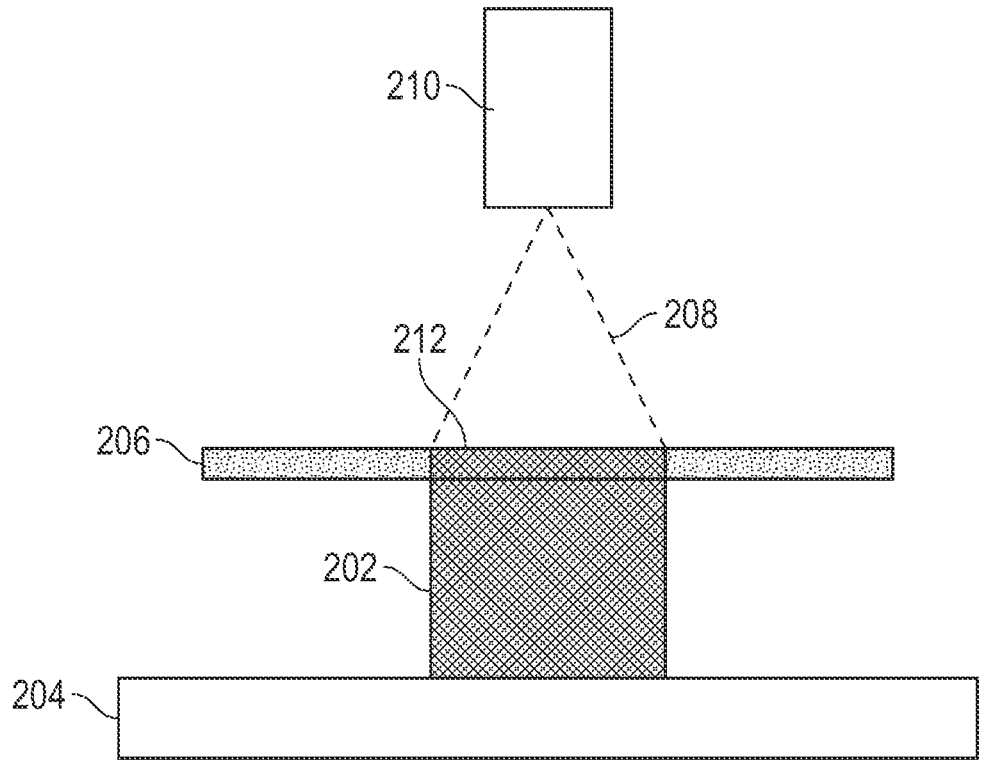
FIG. 2 is a partially schematic diagram providing a general overview of a lithography-based additive manufacturing process, in accordance with embodiments of the present technology.

FIG. 2 is a partially schematic diagram providing a general overview of a lithography-based additive manufacturing process, in accordance with embodiments of the present technology. In the illustrated embodiment, an object 202 is fabricated on a build platform 204 from a series of cured material layers, with each layer having a geometry corresponding to a respective cross-section of the object 202. To fabricate an individual object layer, a layer of curable material 206 (e.g., polymerizable resin) is brought into contact with the build platform 204 (when fabricating the first layer of the object 202) or with the previously formed portion of the object 202 on the build platform 204 (when fabricating subsequent layers of the object 202). In some embodiments, the curable material 206 is formed on and supported by a substrate (not shown), such as a film. Energy 208 (e.g., light) from an energy source 210 (e.g., a laser, projector, or light engine) is then applied to the curable material 206 to form a cured material layer 212 on the build platform 204 or on the object 202. The remaining curable material 206 can then be moved away from the build platform 204 (e.g., by lowering the build platform 204, by moving the build platform 204 laterally, by raising the curable material 206, and/or by moving the curable material 206 laterally), thus leaving the cured material layer 212 in place on the build platform 204 and/or object 202. The fabrication process can then be repeated with a fresh layer of curable material 206 to build up the next layer of the object 202.

The illustrated embodiment shows a "top down" configuration in which the energy source 210 is positioned above and directs the energy 208 down toward the build platform 204, such that the object 202 is formed on the upper surface of the build platform 204. Accordingly, the build platform 204 can be incrementally lowered relative to the energy source 210 as successive layers of the object 202 are formed. In other embodiments, however, the additive manufacturing process of FIG. 2 can be performed using a "bottom up" configuration in which the energy source 210 is positioned below and directs the energy 208 up toward the build platform 204, such that the object 202 is formed on the lower surface of the build platform 204. Accordingly, the build platform 204 can be incrementally raised relative to the energy source 210 as successive layers of the object 202 are formed.

Figure 3:
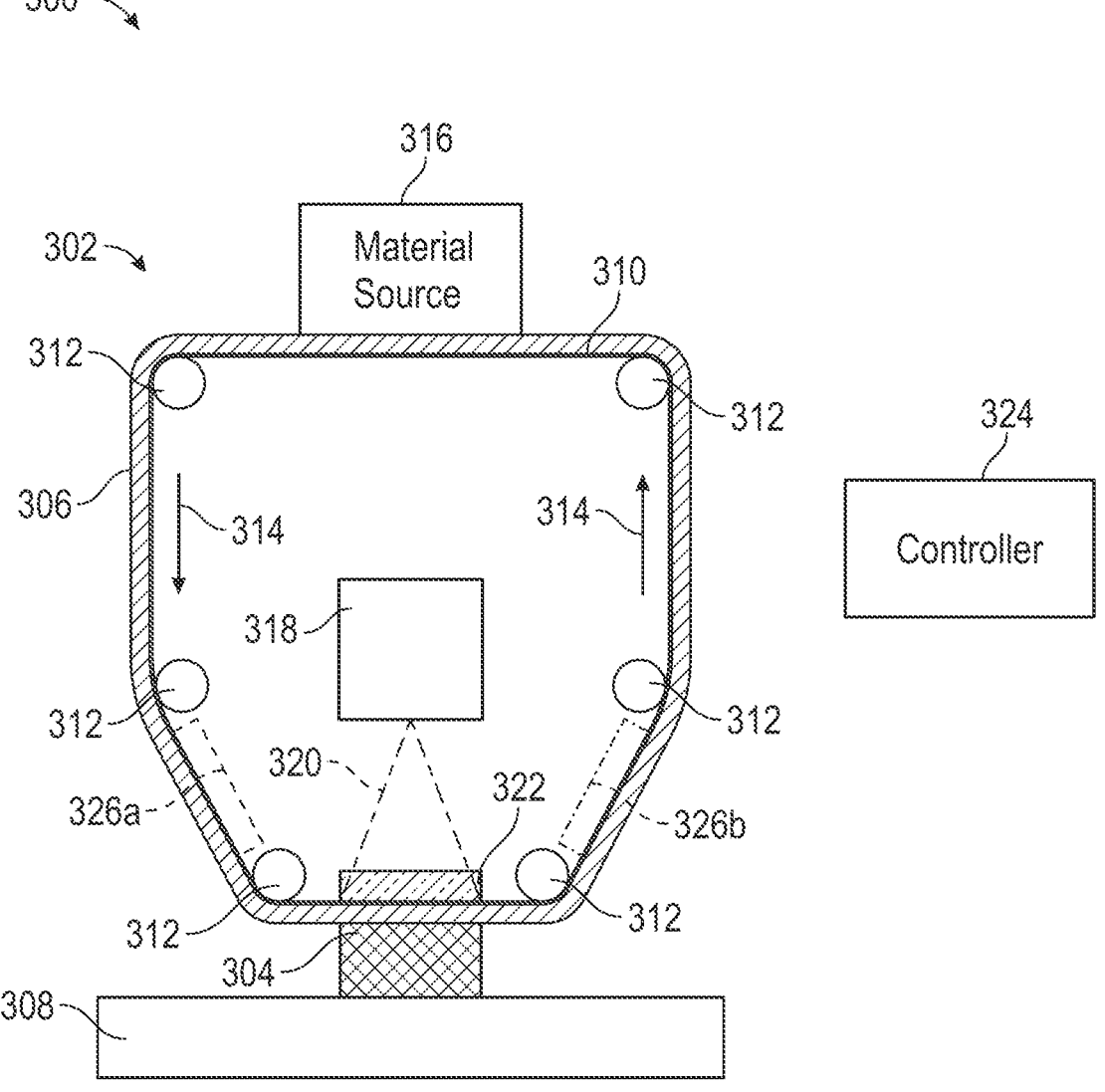
FIG. 3 is a partially schematic diagram of a system for lithography-based additive manufacturing configured in accordance with embodiments of the present technology.

FIG. 3 illustrates a representative example of a system 300 for lithography-based additive manufacturing configured in accordance with embodiments of the present technology. The system 300 can be used to fabricate any embodiment of the objects described herein. For example, the system 300 can be used to produce an object in accordance with block 102 of the method 100 of FIG. 1.

The system 300 includes a printer assembly 302 configured to fabricate an additively manufactured object 304 ("object 304") using any of the additive manufacturing processes described herein, such as a lithography-based additive manufacturing process. The printer assembly 302 is configured to deposit a curable material 306 (e.g., a polymerizable resin or other solidifiable precursor material) on a build platform 308 (e.g., a tray, plate, film, sheet, or other planar substrate) to form the object 304. In the illustrated embodiment, the printer assembly 302 includes a carrier film 310 configured to deliver the curable material 306 to the build platform 308. The carrier film 310 can be a flexible loop of material having an outer surface and an inner surface. The outer surface of the carrier film 310 can adhere to and carry a thin layer of the curable material 306. The inner surface of the carrier film 310 can contact one or more rollers 312 that rotate to move the carrier film 310 in a continuous loop trajectory, e.g., along the direction indicated by arrows 314.

The printer assembly 302 can also include a material source 316 (shown schematically) configured to apply the curable material 306 to the carrier film 310. In the illustrated embodiment, the material source 316 is located at the upper portion of the printer assembly 302. In other embodiments, however, the material source 316 can be at a different location in the printer assembly 302. The material source 316 can include nozzles, ports, vats, reservoirs, etc., that deposit the curable material 306 onto the outer surface of the carrier film 310. The material source 316 can also include one or more blades (e.g., doctor blades, recoater blades) that smooth the deposited curable material 306 into a relatively thin, uniform layer. For example, the curable material 306 can be formed into a layer having a thickness within a range from 200 microns to 300 microns, or any other desired thickness.

The curable material 306 can be conveyed by the carrier film 310 toward the build platform 308. In the illustrated embodiment, the build platform 308 is located below the printer assembly 302. In other embodiments, however, the build platform 308 can be positioned at a different location in the printer assembly 302. The distance between the carrier film 310 and build platform 308 can be adjustable so that the curable material 306 at can be brought into direct contact with the surface of the build platform 308 (when printing the initial layer of the object 304) or with the surface of the object 304 (when printing subsequent layers of the object 304). For example, the build platform 308 can include or be coupled to a motor (not shown) that raises and/or lowers the build platform 308 to the desired height during the manufacturing process. Alternatively or in combination, the printer assembly 302 can include or be coupled to a motor (not shown) that raises and/or lowers the printer assembly 302 relative to the build platform 308.

The printer assembly 302 includes an energy source 318 (e.g., a projector, light engine, laser) that outputs energy 320 (e.g., light, such as UV light) having a wavelength configured to partially or fully cure the curable material 306. The carrier film 310 can be partially or completely transparent to the wavelength of the energy 320 to allow the energy 320 to pass through the carrier film 310 and onto the portion of the curable material 306 above the build platform 308. Optionally, a transparent plate 322 can be disposed between the energy source 318 and the carrier film 310 to guide the carrier film 310 into a specific position (e.g., height) relative to the build platform 308. During operation, the energy 320 can be patterned or scanned in a suitable pattern onto the curable material 306, thus forming a layer of cured material onto the build platform 308 and/or on a previously formed portion of the object 304. The geometry of the cured material can correspond to the desired cross-sectional geometry for the object 304. The parameters for operating the energy source 318 (e.g., energy intensity, energy dosage, exposure time, exposure pattern, exposure wavelength, energy density, power density) can be set based on instructions from a controller 324, as described in further detail below.

In some embodiments, the energy 320 is applied to the curable material 306 while the carrier film 310 moves to circulate the curable material 306 through the exposure zone of the energy source 318. To maintain zero or substantially zero relative velocity between the curable material 306 and the build platform 308, the printer assembly 302 can concurrently move horizontally relative to the build platform 308 opposite the direction of the motion of the carrier film 310 at the exposure zone. The energy 320 output by the energy source 318 can be coordinated with the movement of the carrier film 310 and build platform 308 so that the layer of cured material is formed with the correct geometry. For example, the energy source 318 can be a scrolling light engine (e.g., a scrolling digital light processing engine) that outputs an energy pattern that varies over time to match the motion of the printer assembly 302 and carrier film 310. In other embodiments, however, the printer assembly 302 can be a stationary device that does not move relative to the build platform 308 while the energy 320 is being applied to the curable material 206.

The newly formed layer of cured material can be separated from the carrier film 310 and the remaining curable material 306 at or after the exposure zone. In some embodiments, the separation occurs at least in part due to peel-off forces produced by the carrier film 310 wrapping around the roller 312 immediately downstream of the exposure zone. Peel-off forces can alternatively or additionally be provided by movements of the build platform 308 and/or printer assembly 302 (e.g., raising the printer assembly 302 away from the build platform 308, moving the printer assembly 302 laterally away from the build platform 308); use of a roller, blade, or other mechanism to facilitate separation of the cured material from the carrier film 310; and/or other parameters of the printer assembly such as movement speed of the carrier film 310.

The remaining curable material 306 can be carried by the carrier film 310 away from the build platform 308 and back toward the material source 316. The material source 316 can deposit additional curable material 306 onto the carrier film 310 and/or smooth the curable material 306 to re-form a uniform layer of curable material 306 on the carrier film 310. The curable material 306 can then be recirculated back to the build platform 308 to fabricate an additional layer of the object 304. This process can be repeated to iteratively build up individual object layers on the build platform 308 until the object 304 is complete. The object 304 and build platform 308 can then be removed from the system 300 for post-processing.

In some embodiments, the system 300 is used in a high temperature lithography process utilizing a highly viscous curable material 306 (e.g., a highly viscous resin). Accordingly, the printer assembly 302 can include one or more heat sources (heating plates, infrared lamps, etc.) for heating the curable material 306 to lower the viscosity to a range suitable for additive manufacturing. For example, the printer assembly 302 can include a first heat source 326a positioned against the segment of the carrier film 310 before the build platform 308, and a second heat source 326b positioned against the segment of the carrier film 310 after the build platform 308. Alternatively or in combination, the printer assembly 302 can include heat sources at other locations.

The system 300 also includes a controller 324 (shown schematically) that is operably coupled to the printer assembly 302 and build platform 308 to control the operation thereof. The controller 324 can be or include a computing device including one or more processors and memory storing instructions for performing the additive manufacturing operations described herein. For example, the controller 324 can receive a digital data set (e.g., a 3D model) representing the object 304 to be fabricated, determine a plurality of object cross-sections to build up the object 304 from the curable material 306, and can transmit instructions to the energy source 318 to output energy 320 to form the object cross-sections. The controller 324 can control the energy application parameters of the energy source 318, such as the energy intensity, energy dosage, exposure time, exposure pattern, energy wavelength, and/or energy type of the energy 320 applied to the curable material 306. Optionally, the controller 324 can also determine and control other operational parameters, such as the positioning of the build platform 308 (e.g., height) relative to the carrier film 310, the movement speed and direction of the carrier film 310, the amount of curable material 306 deposited by the material source 316, the thickness of the material layer on the carrier film 310, and/or the amount of heating applied to the curable material 306.

Although FIG. 3 illustrates a representative example of a system 300 for additive manufacturing, this is not intended to be limiting, and the methods described herein can be implemented using other types of additive manufacturing systems, such as vat-based systems, material jetting systems, binder jetting systems, material extrusion systems, powder bed fusion systems, sheet lamination systems, or directed energy deposition systems.

B. Modular Build Platforms and Associated Systems and Methods

Figure 4:
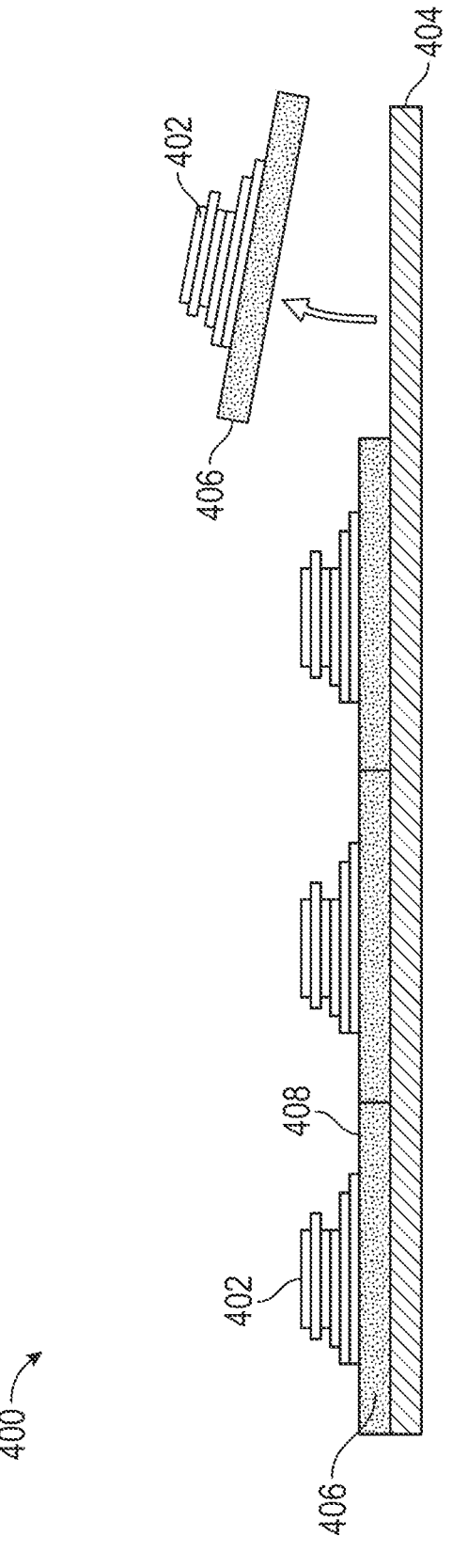
FIG. 4 is a side view of a modular build substrate for additive manufacturing, in accordance with embodiments of the present technology.

FIG. 4 is a side view of a modular build substrate 400 for additive manufacturing, in accordance with embodiments of the present technology. The modular build substrate 400 can be used to support a plurality of objects 402 during additive manufacturing and/or post-processing of the objects 402, such as during any of the processes described in Section II.A above. For example, the modular build substrate 400 can be used during a lithography-based additive manufacturing process for fabricating the objects 402.

The modular build substrate 400 includes a carrier 404 and a plurality of build platforms 406 attached to the carrier 404. The carrier 404 can be a tray, plate, film, sheet, or other generally planar substrate suitable for coupling to and supporting the build platforms 406 during the entire additive manufacturing process. The carrier 404 can be configured to hold any suitable number of build platforms 406, such as two, three, four, five, 10, 20, 50, or more build platforms 406. The build platforms 406 can be arranged on the carrier 404 in a linear array (e.g., a row), a 2D array (e.g., a regular grid), or any other suitable configuration, e.g., as described further below in connection with FIGS. 7A-10B. The arrangement of the build platforms 406 can be varied based on the number and/or geometry of the objects 402 to be fabricated.

The build platforms 406 can collectively form a build plane 408 that defines the total area available for printing the objects 402. In some embodiments, the total area of the build plane 408 formed by the build platforms 406 is at least 1000 $cm^2$, 1500 $cm^2$, 2000 $cm^2$, 2500 $cm^2$, 3000 $cm^2$, 3500 $cm^2$, 4000 $cm^2$, 4500 $cm^2$, or 5000 $cm^2$. In some embodiments, the total area of the build plane is larger than 5000 $cm^2$ to accommodate larger objects and/or faster printing speeds. The build plane 408 can have a length greater than or equal to 20 cm, 50 cm, 100 cm, 150 cm, or 200 cm; and/or a width greater than or equal to 10 cm, 20 cm, 30 cm, 40 cm, or 50 cm.

The build platforms 406 can each be a tray, plate, film, sheet, or other generally planar substrate suitable for coupling to and supporting at least one object 402. Each build platform 406 can independently support any suitable number of objects 402, such as one, two, three, four, five, 10, 20, 50, or more objects 402. Each build platform 406 can be made of any suitable material (e.g., metal (such as aluminum or steel), polymer, ceramic (such as alumina-based ceramics), glass, wood, paper) that exhibits sufficient adhesion to the cured material to support the object 402 during the entire additive manufacturing process. In some embodiments, the build platform 406 is made partially or entirely out of a metal to allow for inductive heating of the build platform 406, e.g., in embodiments where the additive manufacturing process is a high temperature lithography process. Aluminum may be advantageous for facilitating thermal homogeneity, while steel may be advantageous for providing enhanced strength. Composite materials are also contemplated, such as two or more materials arranged in layers or other configurations. The composite materials can be or include includes filled systems, such as silica filled plastics or fiber filled plastics. In some embodiments, the build platforms 406 are injection molded, recyclable, and/or compostable. The surface of the build platform 406 that contacts the object 402 can also be configured to promote adhesion. For instance, each build platform 406 can have a smooth, polished surface, a rough surface, a structured or patterned surface, etc., and/or may include various surface finishes. In embodiments where the build platform 406 is made out of a metal, the surface of the build platform 406 may or may not be anodized.

In some embodiments, the material of the build platform 406 is selected to withstand forces that may be applied to the build platform 406 during post-processing. For example, in embodiments where the build platform 406 and object 402 are centrifuged to remove residual curable material, the build platform 406 can be sufficiently stiff to resist forces arising from centrifugation (e.g., the build platform 406 exhibits little or no bending when subjected to centrifugation). Optionally, the lower surface of the build platform 406 can include ridges and/or other reinforcement features formed therein to enhance the stiffness of the build platform 406 while reducing the overall weight of the build platform 406.

The geometry of each build platform 406 can be varied as desired. For instance, each build platform 406 can have any suitable shape, such as rectangular, square, triangular, trapezoidal, oval, circular, or any other polygonal or non-polygonal shape. Some or all of the build platforms 406 can have the same shape, or some or all of the build platforms 406 can have different shapes. Moreover, each build platform 406 can have any suitable size, such as an area within a range from 100 $cm^2$ to 1000 $cm^2$, 100 $cm^2$ to 500 $cm^2$, 100 $cm^2$ to 200 $cm^2$, 200 $cm^2$ to 1000 $cm^2$, 200 $cm^2$ to 500 $cm^2$, or 500 $cm^2$ to 1000 $cm^2$. For example, an individual build platform 406 can have a length and/or width that is less than or equal to 50 cm, 40 cm, 30 cm, 25 cm, 20 cm, 15 cm, or 10 cm. Some or all of the build platforms 406 can have the same size, or some or all of the build platforms 406 can have different sizes.

The build platforms 406 can be releasably coupled to the carrier 404 so that each build platform 406 is independently removable from the carrier 404. The coupling between each build platform 406 and the carrier 404 can be configured to maintain the build platform 406 in a stable position and orientation during the additive manufacturing process, while also allowing for easy detachment of the build platform 406 from the carrier 404 upon completion of the additive manufacturing process and/or in preparation for post-processing of the objects 402. Examples of attachment mechanisms that may be used to releasably couple the build platforms 406 to the carrier 404 include vacuum, mechanical fixation (e.g., interference fit, snap fit, interlocking features, fasteners, form-fitting inserts, clamps, springs, hinged features), electromagnetic fixation, magnetic fixation, and combinations thereof.

In some embodiments, when the build platforms 406 are coupled to the carrier 404, the upper surfaces of the build platforms 406 are level with each other to define a flat build plane 408. For example, the maximum difference between the vertical positions of the upper surfaces of the build platforms 406 (also referred to herein as the "vertical deviation of the build plane 408") can be no more than 500 μm, 400 μm, 300 μm, 200 μm, 100 μm, or 50 μm. The maximum vertical deviation of the build plane 408 can be less than or equal to the thickness of an individual layer of the object 402 (e.g., the layer thickness can be within a range from 50 μm to 150 μm). In some embodiments, a flat build plane 408 is significant for ensuring proper adhesion of the initial layer(s) of the object 402. A flat build plane 408 can be achieved, for example, via attachment mechanisms that avoid buckling of the build plane 408 when coupled to the carrier 404.

The build platforms 406 can be "modular" build platforms 406 in that each build platform 406 can be independently selected, positioned on the carrier 404, and/or removed from the carrier 404. The use of such modular build platforms 406 can provide various advantages, such as providing a larger build plane 408 (e.g., for higher throughput printing) that can be segmented into smaller individual build platforms 406 that are compatible with post-processing devices (e.g., centrifuges, solvent cleaning devices (solvent baths such as ultrasonic solvent baths), UV or thermal furnaces, ovens (such as curing and/or annealing ovens), chillers, laser marking devices, laser cutting devices, ink jetting devices, powder coating devices, dip coating devices, spraying devices, conveyor belts, drying devices (dryers such as air blade dryers)); allowing build platforms 406 to be individually removed and replaced (e.g., if the build platform 406 becomes damaged or fouled); and/or allowing the type, geometry, and/or arrangement of the build platforms 406 to be varied in a modular fashion to accommodate different printing operations (e.g., different sizes, shapes, and/or arrangements of objects 402).

In some embodiments, some or all of the build platforms 406 can include recesses (e.g., cavities, holes, pores, hollows, gaps, grooves), and the curable material can flow through and/or into the recesses. The curable material that flows through and/or into the recesses can be collected below the build platforms 406 for reuse in subsequent printing operations. For instance, the carrier 404 can include or be coupled to a container for collecting the curable material.

Optionally, the carrier 404 and/or the build platforms 406 can include an identifier. The identifier can be an electronic tag that is coupled to the carrier 404 and/or build platforms 406, such as an RFID chip. Alternatively or in combination, the identifier can be a machine-readable marking (e.g., a camera-readable marking) such as a barcode, QR code, or other pattern that is engraved or otherwise formed in the carrier 404 and/or build platforms 406. The identifier can be used to automatically identify the carrier 404 and/or the individual build platforms 406, thereby allowing the objects 402 on the carrier 404 and/or build platforms 406 to be tracked throughout the manufacturing operation.

Figure 5:
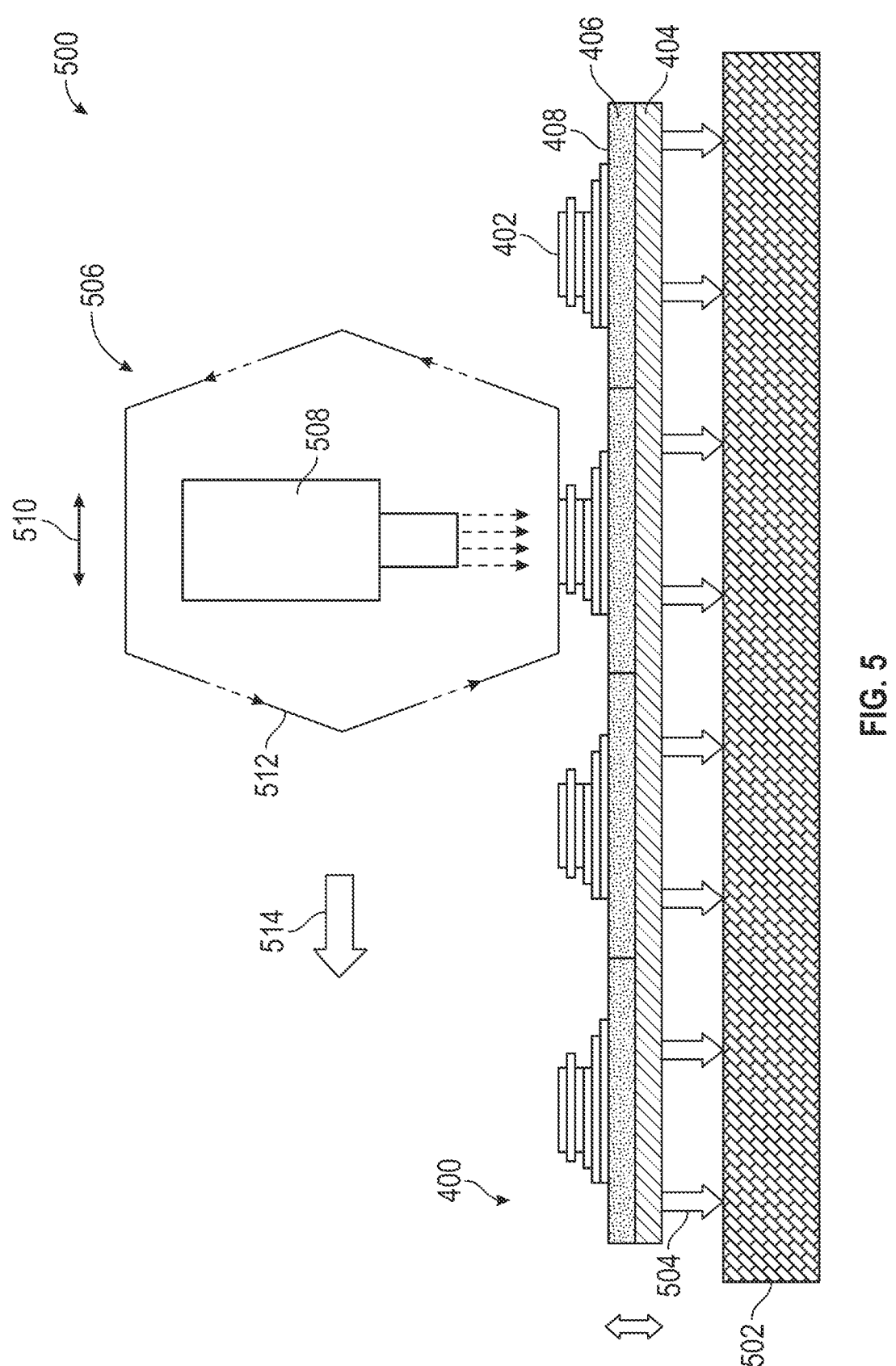
FIG. 5 is a partially schematic diagram of an additive manufacturing system including a modular build substrate, in accordance with embodiments of the present technology.

FIG. 5 is a partially schematic diagram of an additive manufacturing system 500 including the modular build substrate 400, in accordance with embodiments of the present technology. The system 500 can be a 3D printer that is used to fabricate a plurality of 3D objects 402 using any suitable additive manufacturing technique, such as a lithography-based additive manufacturing process in which the objects 402 are fabricated from a curable material in a layer-by-layer manner, as described herein.

In the illustrated embodiment, the modular build substrate 400 is coupled to and held down onto a stationary base 502 (also known as a "base carrier") of the system 500. The base 502 can be a tray, plate, film, sheet, stage, table, or other generally planar substrate suitable for coupling to and supporting the modular build substrate 400 during the additive manufacturing process. As shown in FIG. 5, the carrier 404 of the modular build substrate 400 can be coupled to the base 502 via an attachment mechanism 504 (also known as a "fixing means"). The attachment mechanism 504 can utilize any suitable releasable coupling technique, such as vacuum, mechanical fixation (e.g., interference fit, snap fit, interlocking features, form-fitting inserts, clamps, springs, hinged features), electromagnetic fixation, magnetic fixation, or combinations thereof. In this way, the carrier 404 can be separated from the base 502, thus allowing the entire modular build substrate 400 to be automatically or manually removed from the system 500 after the additive manufacturing process has been completed.

As described herein, the manufacturing cycle for the objects 402 can include additive manufacturing of the objects 402 using the system 500, at least one post-processing operation, and the subsequent removal of the objects 402 from the associated build platform 406. In the illustrated embodiment, the objects 402 are additively manufactured in a layer-by-layer manner by a movable printer assembly 506 (also known as a "print head") including an energy source 508 (e.g., a light engine), which travels over and across the build plane 408 formed by the build platforms 406 (e.g., along the directions indicated by arrows 510). The components and operation of the printer assembly 506 can be identical or generally similar to those of the printer assembly 302 of FIG. 3. For instance, the movable printer assembly 506 can be configured to apply a layer of a curable material (e.g., a light-polymerizable resin) onto an endless movable carrier film 512 (also known as a "carrier foil"), which can move in a circulating loop trajectory around the energy source 508 (e.g., in a counter-clockwise direction as shown in FIG. 5). The carrier film 512 can convey the layer of curable material into an exposure zone of the energy source 508, such that the curable material is exposed and cured while the printer assembly 506 is driven to move across the plurality of build platforms 406 (e.g., along the direction indicated by arrow 514, which represents the printing direction for the illustrated movement direction of the carrier film 512). Accordingly, a layer of cured material corresponding to a cross-section of each object 402 can be formed on the corresponding build platform 406. The modular build substrate 400 can then then be lowered (e.g., via an elevator mechanism, which may be coupled to or part of the base 502—not shown) and/or the movable printer assembly 506 can be raised in preparation for forming the next layer of cured material. This process can be repeated to build up the objects 402 from a plurality of sequential layers of cured material.

After the additive manufacturing process, the build platforms 406 with the respective fabricated objects 402 can be individually removed from the carrier 404. The process of the build platforms 406 from the carrier 404 can be performed outside or inside the system 500. Optionally, the carrier 404 can be removed from the base 502 before removing the build platforms 406 from the carrier 404. Thereafter, the individual build platforms 406 with the respective fabricated objects 402 arranged thereon can be subjected to at least one post-processing operation. For instance, the post-processing operation can include removing residual curable material from the objects object 402, removing solvents from the objects 402, applying pressurized air to the objects 402, drying the objects 402, removing support structures from the objects 402, post-curing the objects 402, and/or performing surface modifications to the objects 402. Some or all of these processes can be performed while the objects 402 remain on their respective build platforms 406. Moreover, because the build platforms 406 can be separated from each other, objects 402 on different build platforms 406 can be processed at different types and/or using different post-processing techniques.

The configuration of the system 500 can be varied in many ways. For instance, the base 502 can be omitted, such that the carrier 404 serves as directly as the stationary base during additive manufacturing. The system 500 can include additional components not shown in FIG. 5, such as a controller including one or more processors and memory storing instructions for controlling the operation of the system 500. In some embodiments, the build platforms 406 are cooled (e.g., via one or more cooling devices such as thermoelectric coolers, cold plates, cooled fluids, etc.). For instance, some or all of the build platforms 406 may be cooled to a surface temperature at the build plane 408 within a range from 20° C. to −150° C., or from 20° C. to −20° C. In other embodiments, some or all of the build platforms 406 may be heated (e.g., via one or more heating devices such as thermoelectric heaters, heat sinks, heating plates, heat lamps, heated fluid, inductive heaters, etc.). For instance, some or all of the build platforms 406 may be heated to a surface temperature at the build plane 408 within a range from 20° C. to 200° C., or from 30° C. to 90° C. Accordingly, the system 500 can include cooling and/or heating devices at any suitable location, such as between the build platforms 406 and carrier 404, between the carrier 404 and the base 502, within the build platforms 406, within the carrier 404, within the base 502, etc.

Figure 6:
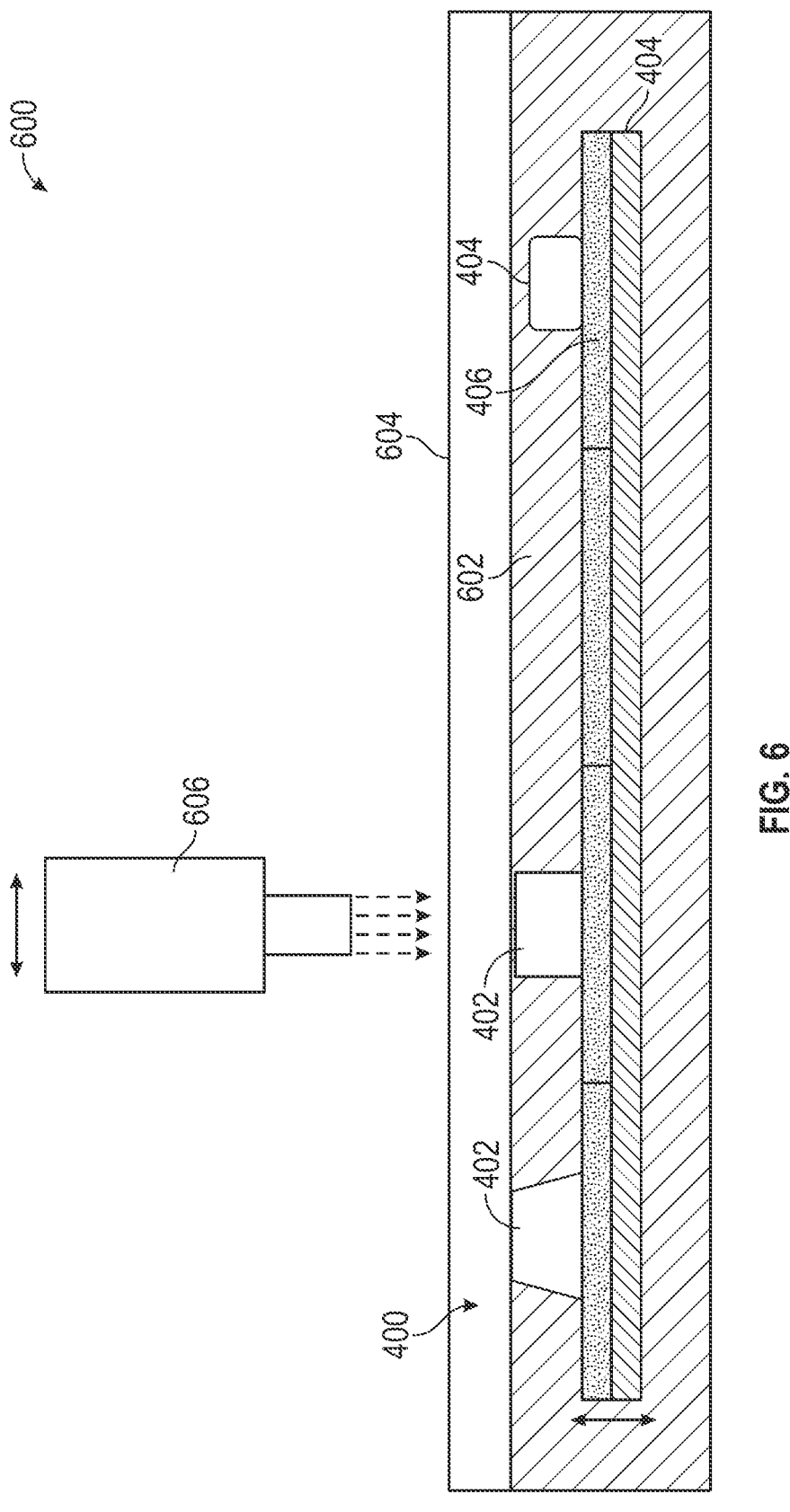
FIG. 6 is a partially schematic diagram of another additive manufacturing system including a modular build substrate, in accordance with embodiments of the present technology.

FIG. 6 is a partially schematic diagram of another additive manufacturing system 500 including the modular build substrate 400, in accordance with embodiments of the present technology. The system 600 can be a 3D printer that is used to fabricate a plurality of 3D objects 402 using any suitable additive manufacturing technique, such as a lithography-based additive manufacturing process in which the objects 402 are fabricated from a curable material in a layer-by-layer manner, as described herein. In the illustrated embodiment, the system 600 is configured for a vat-based additive manufacturing process, in which the modular build substrate 400, including the carrier 404 with the build platforms 406 thereon, is immersed into a volume (e.g., a bath) of curable material 602 (e.g., light-polymerizable resin) within a reservoir 604 (e.g., a vat). One or more movable energy sources 606 (e.g., light engines) can locally irradiate a thin layer of the curable material 602 that extends above the build platforms 406 and/or the partly built objects 402. In this way, the objects 402 can be built layer-by-layer. Each time a layer has been cured, the modular build substrate 400 can be lowered (e.g., via an elevator mechanism— not shown) in preparation for curing the next layer.

After the additive manufacturing process, the build platforms 406 with the respective fabricated objects 402 can be individually removed from the carrier 404, which may be performed outside or inside the system 600. The carrier 404 can be removed from the reservoir 604 before removing the build platforms 406 from the carrier 404, or the build platforms 406 can be removed from the carrier 404 while the carrier 404 is within the reservoir 604. Thereafter, the individual build platforms 406 with the respective fabricated objects 402 arranged thereon can be subjected to at least one post-processing step, as described elsewhere herein.

The configuration of the system 600 can be varied in many ways. For example, the system 600 can include additional components not shown in FIG. 6, such as a controller including one or more processors and memory storing instructions for controlling the operation of the system 600. The system 600 can optionally include a base that is releasably coupled to the carrier 404 to support the modular build substrate 400 (e.g., similar to the base 502 of FIG. 5). In such embodiments, the base can be a movable stage that is positioned within the reservoir 604 to raise and lower the modular build substrate 400 during the additive manufacturing process. Moreover, in some embodiments, the build platforms 406 are cooled (e.g., via one or more cooling devices such as thermoelectric coolers, cold plates, cooled fluids, etc.), while in other embodiments, the build platforms may be heated (e.g., via one or more heating devices such as heat sinks, heating plates, heat lamps, heated fluid, etc.). Accordingly, the system 600 can include cooling and/or heating devices at any suitable location, such as between the build platforms 406 and carrier 404, between the carrier 404 and the base, within the build platforms 406, within the carrier 404, within the base, within the reservoir 604, coupled to the reservoir 604, etc.

It will be appreciated that the modular build substrates and build platforms described herein can be used in other types of additive manufacturing processes besides the embodiments illustrated in FIGS. 5 and 6. For example, the build platforms described herein can also be used as a valuable tool to facilitate post-processing in bottom-up, top-down, or volumetric radiation-curing vat polymerization processes as well as static film lamination processes. For example, a coating of light-polymerizable resin can be applied on a carrier film and can be irradiated with a static light engine, thereby building up one or more 3D objects on the build platforms arranged on the carrier.

FIGS. 7A-12 illustrate additional features of modular build substrates and build platforms configured in accordance with embodiments of the present technology. Any of the embodiments described in connection with FIGS. 7A-12 can be combined with each other and/or with the embodiments described in connection with FIGS. 4-6. Moreover, the modular build substrates and build platforms described in connection with FIGS. 7A-12 can be generally similar to the modular build substrate 400 and build platform 406 of FIG. 4, such that like numbers (e.g., build platform 406 versus build platform 706) are used to identify similar or identical components, and the following discussion of FIGS. 7A-12 will be limited to those features that differ from the embodiments described in connection with FIG. 4.

Figures 7A, 7B:
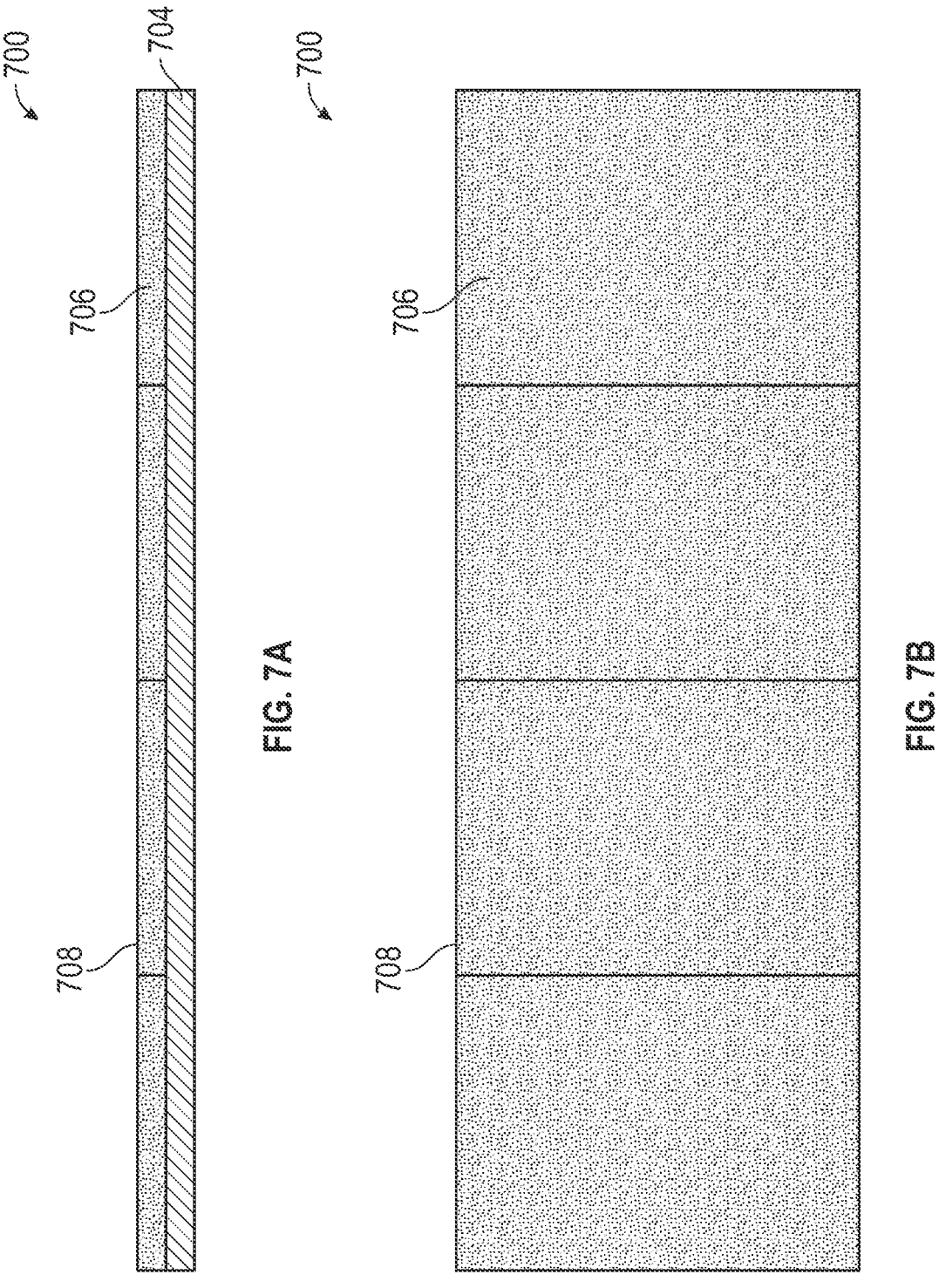
FIG. 7A is a side view of a modular build substrate configured in accordance with embodiments of the present technology.
FIG. 7B is a top view of the modular build substrate of FIG. 7A.

FIGS. 7A-10B illustrate modular build substrates with various configurations of build platforms. For example, FIGS. 7A and 7B are side and top views of a modular build substrate 700 configured in accordance with embodiments of the present technology. The modular build substrate 700 includes a carrier 704 and a plurality of build platforms 706 releasably coupled to the carrier 704. In the illustrated embodiment, the build platforms 706 each have a rectangular shape and are arranged in a line configuration (e.g., a linear array such as a row) on the carrier 704. The build platforms 706 can be seamlessly and/or tightly packed next to each other so there is little or no gap between adjacent build platforms 706 (e.g., the distance between adjacent build platforms 706 is no more than 200 μm, 100 μm, 50 μm, 25 μm, or 10 μm). Accordingly, the build platforms 706 can collectively define a single continuous build plane 708 for fabricating one or more objects.

Figures 8A, 8B:
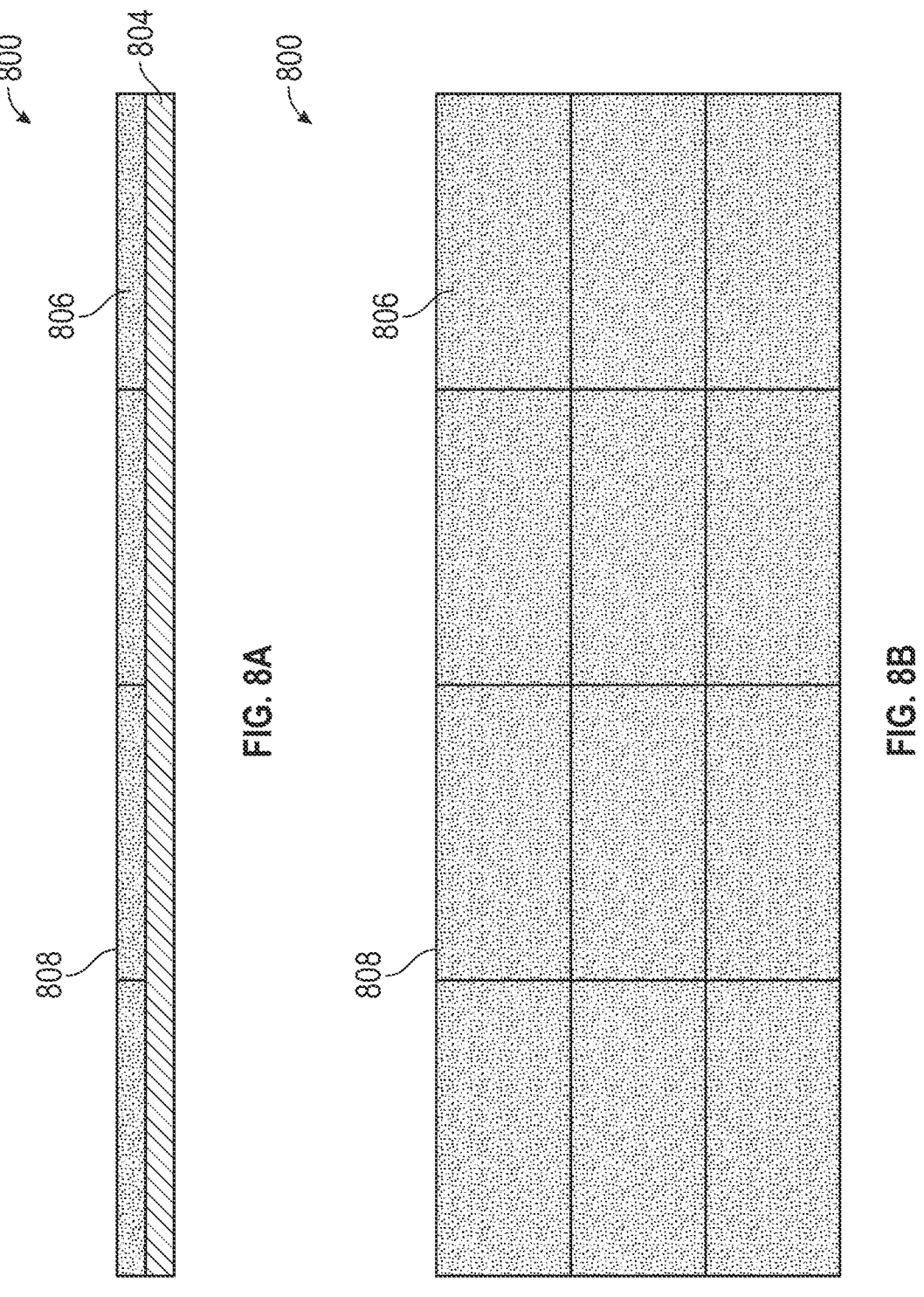
FIG. 8A is a side view of another modular build substrate configured in accordance with embodiments of the present technology.
FIG. 8B is a top view of the modular build substrate of FIG. 8A.

FIGS. 8A and 8B are side and top views of another modular build substrate 800 configured in accordance with embodiments of the present technology. The modular build substrate 800 includes a carrier 804 and a plurality of build platforms 806 releasably coupled to the carrier 804. In the illustrated embodiment, the build platforms 806 each have a rectangular shape and are arranged in a grid configuration (e.g., a 2D array including a plurality of rows and a plurality of columns) on the carrier 804. The build platforms 806 can be seamlessly and/or tightly packed next to each other so there is little or no gap between adjacent build platforms 806 (e.g., the distance between adjacent build platforms 806 is no more than 200 μm, 100 μm, 50 μm, 25 μm, or 10 μm). Accordingly, the build platforms 806 can collectively define a single continuous build plane 808 for fabricating one or more objects.

Figures 9A, 9B:
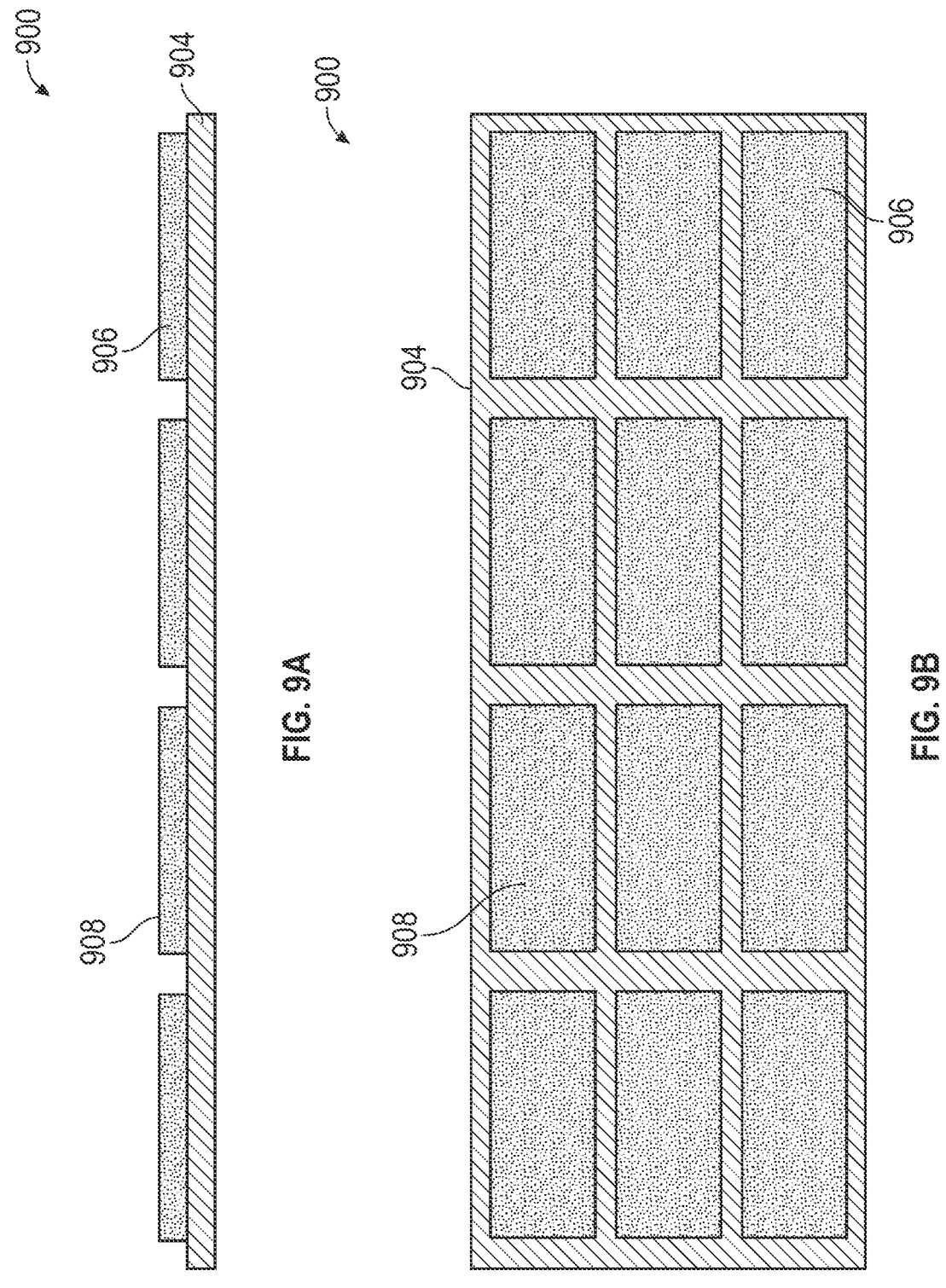
FIG. 9A is a side view of yet another modular build substrate configured in accordance with embodiments of the present technology.
FIG. 9B is a top view of the modular build substrate of FIG. 9A.

FIGS. 9A and 9B are side and top views of yet another modular build substrate 900 configured in accordance with embodiments of the present technology. The modular build substrate 900 includes a carrier 904 and a plurality of build platforms 906 releasably coupled to the carrier 904. In the illustrated embodiment, the build platforms 906 each have a rectangular shape and are arranged in a grid configuration (e.g., a 2D array including a plurality of rows and a plurality of columns) on the carrier 904. The build platforms 906 can be spaced apart from each other, such that there are gaps between adjacent build platforms 906 through which the carrier 904 is exposed. Accordingly, the build plane 908 of the modular build substrate 900 can be segmented into a plurality of discrete regions, each corresponding to a respective build platform 906.

Figures 10A, 10B:
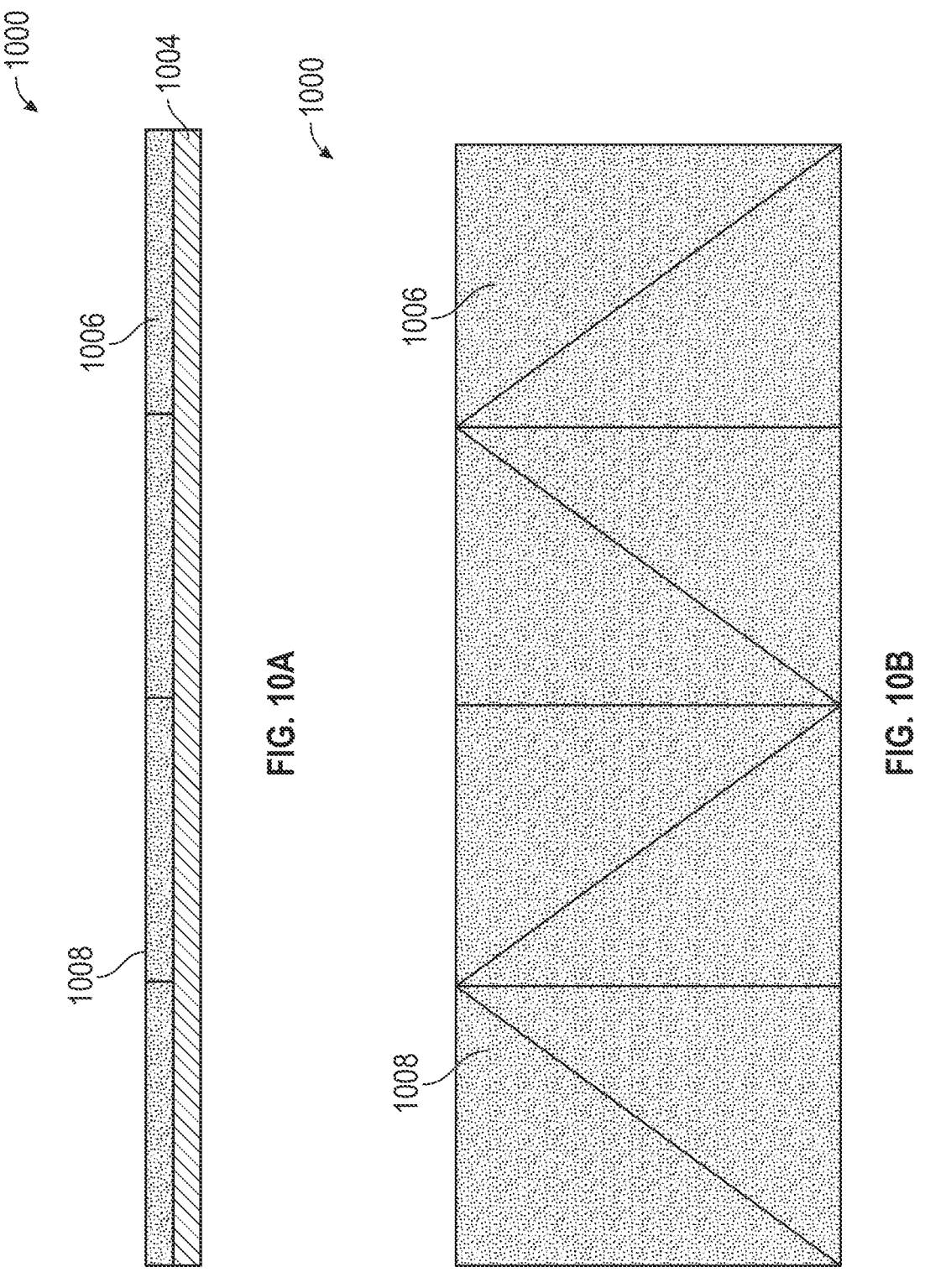
FIG. 10A is a side view of another modular build substrate configured in accordance with embodiments of the present technology.
FIG. 10B is a top view of the modular build substrate of FIG. 10A.

FIGS. 10A and 10B are side and top views of another modular build substrate 1000 configured in accordance with embodiments of the present technology. The modular build substrate 1000 includes a carrier 1004 and a plurality of build platforms 1006 releasably coupled to the carrier 1004. In the illustrated embodiment, the build platforms 1006 each have a triangular shape and are arranged in a line configuration (e.g., a linear array such as a row) on the carrier 1004. The build platforms 1006 can be seamlessly and/or tightly packed next to each other so there is little or no gap between adjacent build platforms 1006 (e.g., the distance between adjacent build platforms 1006 is no more than 200 μm, 100

µm, 50 µm, 25 µm, or 10 µm). Accordingly, the build platforms 1006 can collectively define a single continuous build plane 1008 for fabricating one or more objects.

FIGS. 11A-11G illustrate a build platform 1106 including recesses 1110 configured in accordance with embodiments of the present technology. The build platform 1106 can be a modular build platform that is part of a modular build substrate, as described herein. For example, the build platform 1106 can be releasably coupled to a carrier during an additive manufacturing process, and can be separated from the carrier during post-processing.

Referring first to FIGS. 11A (side view) and 11B (top view) together, the build platform 1106 includes a plurality of recesses 1110 formed therein. As best seen in FIG. 11A, the recesses 1110 can be indentations, cavities, cutouts, etc., that are formed in the upper surface of the build platform 1106. The recesses 1110 can extend partially or entirely through the thickness of the build platform 1106 toward the lower surface of the build platform 1106. Although the illustrated embodiment includes six recesses 1110, in other embodiments, the build platform 1106 can include a different number of recesses 1110, such as one, two, three, four, five, 10, 20, or more recesses 1110. Moreover, although the recesses 1110 are depicted as being arranged in a grid configuration, the recesses 1110 can alternatively be arranged in other configurations, such as in a line, cluster, or any other regular or irregular pattern. Some or all of the recesses 1110 can have the same geometry (e.g., the same size and/or shape), or some or all of the recesses 1110 can have different geometries (e.g., different sizes and/or shapes).

Referring next to FIGS. 11C (side view) and 11D (top view) together, the recesses 1110 of the build platform 1106 are each configured to receive a respective prefabricated element 1112. The shape of the prefabricated element 1112 can be identical or similar to the shape of the corresponding recess 1110 such that the prefabricated element 1112 is received within the recess 1110 in a form-fitting manner. In the illustrated embodiment, for example, the prefabricated element 1112 and recess 1110 each have a square shape. In other embodiments, however, the prefabricated element 1112 and recess 1110 can have any other suitable shape, such as rectangular, circular, oval, triangular, polygonal, non-polygonal, etc.

The prefabricated element 1112 can be releasably coupled to the build platform 1106. For example, the releasable coupling can include a mechanical connection, such as via one or more fasteners (e.g., screws, bolts) and/or a mechanical fit (e.g., interference fit, snap fit). Alternatively or in combination, the releasable coupling can involve a chemical connection (e.g., gluing, crosslinking, curing) and/or physical attachment mechanisms (e.g., vacuum, capillary forces, magnetic forces). Accordingly, the build platform 1106 can act as an adapter structure or adapter plate for the prefabricated elements 1112.

Referring next to FIGS. 11E (side view) and 11F (top view) together, each prefabricated element 1112 can be arranged so that its upper surface is flush with the build plane 1108 of the build platform 1106. Accordingly, an additively manufactured object 1102 can be built on top of the prefabricated element 1112. In some embodiments, at least a portion of the object 1102 (e.g., the initial layer of the object 1102 deposited onto the prefabricated element 1112) adheres to the prefabricated element 1112 so that the prefabricated element 1112 is integrated into and becomes part of the object 1102. The prefabricated element 1112 can be made out of a different material than the object 1102, such that the final product is a multi-material 3D structure including both the object 1102 and the prefabricated element 1112. Alternatively, the prefabricated element 1112 can be made out of the same material as the object 1102.

This approach can be used to incorporate various types of prefabricated elements 1112 into an object 1102. For instance, in embodiments where the object 1102 is a dental appliance, the prefabricated element 1112 can be a functional component to be integrated into the dental appliance, such as an electronics module, battery, sensor, wire, bracket, elastic, block, etc. In some embodiments, the object 1102 is a first portion of the dental appliance that is made out of a first material, and the prefabricated element 1112 is a second portion of the dental appliance that is made out of a second, different material.

Referring next to FIGS. 11G (side view) and 11H (top view), once the additive manufacturing process is complete, the object 1102 can be removed from the build platform 1106 together with the prefabricated element 1112, leaving the recesses 1110 empty. The build platform 1106 can then be reused for subsequent additive manufacturing operations.

Although FIGS. 11A-11H illustrate a build platform 1106 with recesses 1110 for receiving prefabricated elements 1112, in other embodiments, the recesses 1110 can be omitted, such that the prefabricated elements 1112 are placed directly on the upper surface of the build platform 1106.

Figure 12:
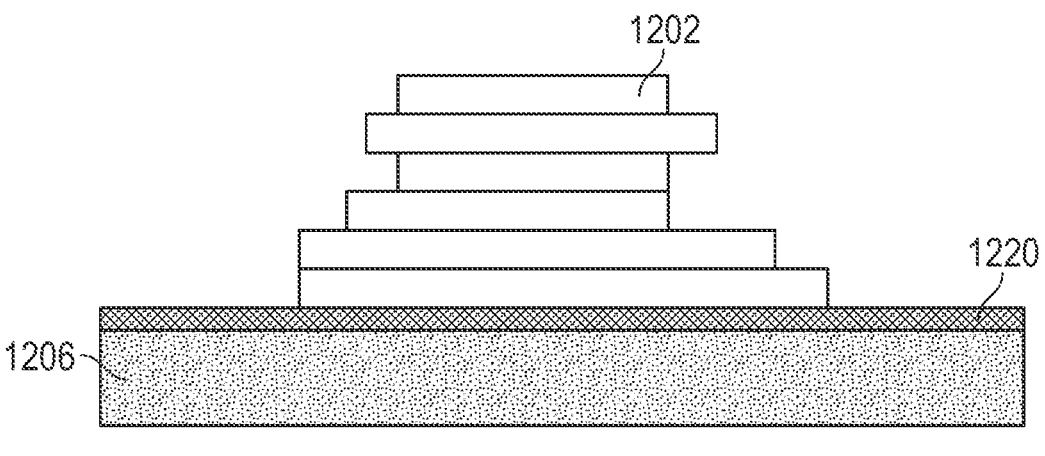
FIG. 12 is a side view of a build platform including an interface layer, in accordance with embodiments of the present technology.

FIG. 12 is a side view of a build platform 1206 including an interface layer 1220, in accordance with embodiments of the present technology. The interface layer 1220 can be a film, membrane, sheet, barrier, etc., that is positioned on an upper surface of the build platform 1206 to facilitate separation of an additively manufactured object 1202 from the build platform 1206 (e.g., after post-processing of the object 1202 is complete).

The interface layer 1220 can be made of a material that differs from the material used to fabricate the object 1202. For instance, the material of the interface layer 1220 can differ from the material of the object 1202 with respect to at least one physical and/or chemical property, such as melting point, boiling point, solubility, etc. In some embodiments, the interface layer 1220 is made partially or entirely from a material that is polymerizable and, in its polymerized and/or pre-polymerized state, can be dissolved or swollen in a solvent. Such a material can include or consist of at least one polymerizable group, such as an acrylate, methacrylate, acrylamide, vinyl ether, vinyl ester, maleimide, cyclic ether, isocyanate, amine, or other polymerizable unsaturated or saturated group. The material can optionally further comprise at least one hydrophilic or oleophilic group. The polymerized and/or pre-polymerized material may be dissolvable or swellable in a solvent, such as water, alcohol, oil, or other organic solvents. Such materials can include, for example, hydroxyl, carbonyl, or carboxyl groups, and/or derivatives with other electronegative heteroatoms, amines, ionic liquids, and/or salts. For example, the material can be or include hydroxyethylacrylate (HEA), hydroxyethylmethacrylate (HEMA), 2-(2-ethoxyethoxy)ethyl acrylate (EOEOEA), acryloyl morpholine (ACMO), polyethylene glycol derivates, polyethers, hydroxy ethylene, and/or lauryl acrylates.

The interface layer 1220 can be applied to the build platform 1206 before the object 1202 is fabricated on the build platform 1206. For instance, the interface layer 1220 can be applied via spray coating, dip coating, spin coating, adhesives, chemical deposition techniques, and/or other suitable coating techniques. The object 1202 can then be fabricated on the interface layer 1220 via an additive manu-facturing process. The material of the object 1202 can exhibit sufficient adhesion to the interface layer 1220 so the object 1202 can be stably supported on the build platform 1206 during additive manufacturing.

After the additive manufacturing process, the interface layer 1220 can be removed from the build platform 1206 via a post-processing operation to destabilize, eliminate, or otherwise remove the interface layer 1220, thereby causing the object 1202 to be detached from the build platform 1206. For example, the interface layer 1220 can be removed by subjecting the interface layer 1220 to a physical and/or chemical process that causes the interface layer 1220 to disintegrate or otherwise lose its stability, such as dissolving in a solvent, etching, melting, etc. Alternatively or in com-bination, the interface layer 1220 can be removed by peel-ing, scraping, or otherwise physically separating the inter-face layer 1220 from the build platform 1206.

In some embodiments, the object 1202 is removed from the build platform 1206 together with the interface layer 1220, and is subsequently separated from the interface layer 1220 in a separate process step via physical and/or chemical processes. Alternatively, the removal of the interface layer 1220 from the build platform 1206 can simultaneously cause separation of the object 1202 from the interface layer 1220, e.g., if the interface layer 1220 is dissolved, melted, etched, etc.

Figure 13:
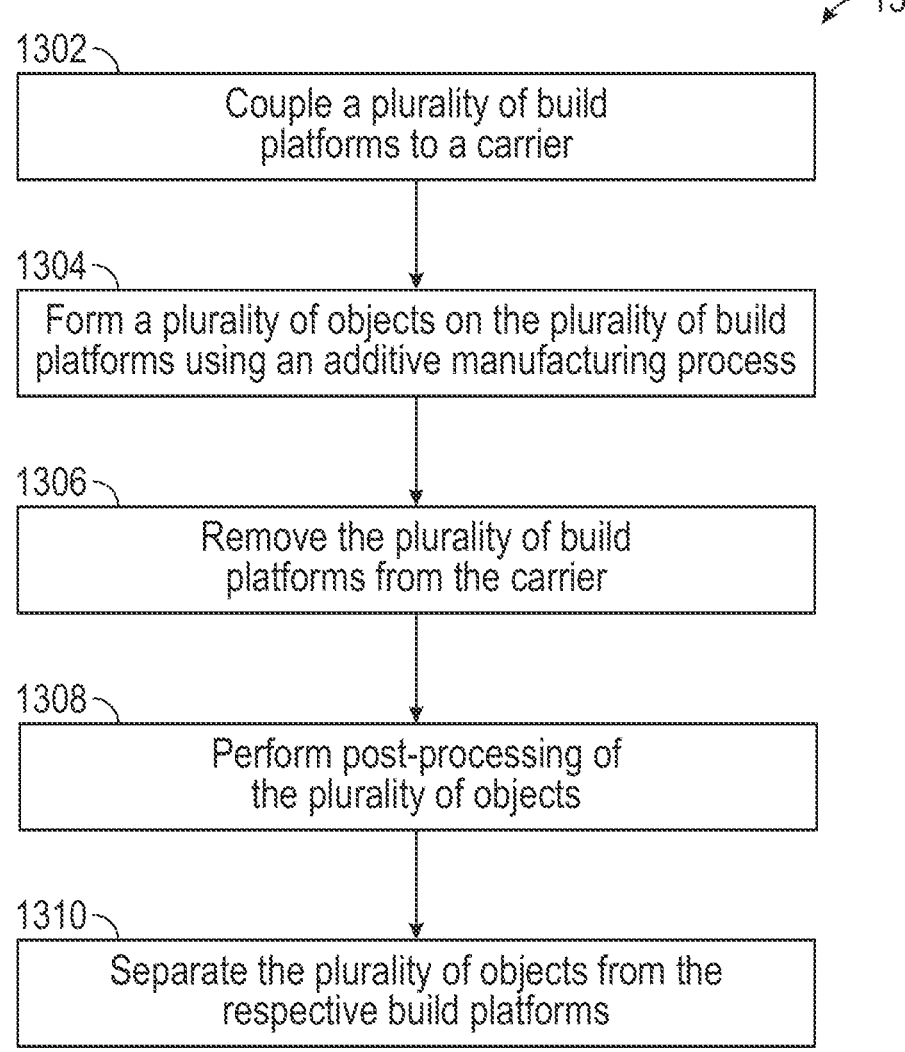
FIG. 13 is a flow diagram illustrating a method for fabricating additively manufactured objects, in accordance with embodiments of the present technology.

FIG. 13 is a flow diagram illustrating a method 1300 for fabricating additively manufactured objects, in accordance with embodiments of the present technology. The method 1300 can be performed by any of the systems and devices described herein, such as any of the embodiments of FIGS. 1-12. In some embodiments, some or all of the processes of the method 1300 are implemented as computer-readable instructions (e.g., program code) that are configured to be executed by one or more processors of a computing device, such as a controller of an additive manufacturing system and/or a post-processing system. The method 1300 can be combined with any of the other methods described herein, such as the method 100 of FIG. 1.

The method 1300 can begin at block 1302 with coupling a plurality of build platforms to a carrier. The build platforms can be modular build platforms that are releasably coupled to the carrier to form a modular build substrate for an additive manufacturing process, as described herein in con-nection with FIGS. 4-12. For example, the build platforms can be coupled to the carrier via a releasable attachment technique, such as via vacuum, mechanical fixation (e.g., interference fit, snap fit, interlocking features, fasteners, form-fitting inserts, clamps, springs, hinged features), elec-tromagnetic fixation, magnetic fixation, form-fitting inserts, or suitable combinations thereof. When coupled to the carrier, the build platforms can collectively define a build plane for an additive manufacturing process. The build plane can have an area of at least 1000 cm$^2$, 1500 cm$^2$, 2000 cm$^2$, 2500 cm$^2$, 3000 cm$^2$, 3500 cm$^2$, 4000 cm$^2$, 4500 cm$^2$, or 5000 cm$^2$. The build plane can have a maximum vertical deviation that is less than or equal to 500 μm, 400 μm, 300 μm, 200 μm, 100 μm, or 50 μm.

At block 1304, the method 1300 can include forming a plurality of objects on the plurality of build platforms using an additive manufacturing process. The objects can be dental appliances, such as aligners, retainers, brackets and wires, whitening trays, mouth guards, night guards, anti-bruxing or anti-grinding devices, tongue thrust devices, palatal expand-ers, sleep apnea devices, anti-snoring devices, attachment templates, mandibular advancement devices, prefabricated attachment templates, etc. The additive manufacturing pro-cess can use any of the additive manufacturing techniques and systems described herein. For instance, the additive manufacturing process can be a lithography-based additive manufacturing process in which the objects are fabricated from a curable material in a layer-by-layer manner. Each build platform can receive and support one or more of the objects during the additive manufacturing process. For instance, a single build platform can receive one, two, three, four, five, 10, 20, or more objects. During the additive manufacturing process, the plurality of build platforms can remain coupled to the carrier, such that the carrier acts as a fixed support for the build platforms and the objects thereon.

At block 1306, the method 1300 can continue with removing the plurality of build platforms from the carrier. The removal can be performed after the additive manufac-turing process is complete. In some embodiments, the build platforms are removed manually by a human operator, while in other embodiments, the build platforms are removed automatically (e.g., by a robotic assembly or other auto-mated mechanism). The build platforms can be removed while the carrier remains within the additive manufacturing system, or the carrier can be removed from the additive manufacturing system before removing the build platforms from the carrier.

At block 1308, the method 1300 can include performing post-processing of the plurality of objects. The post-pro-cessing can include any of the operations described herein, such as removing residual material from the objects, post-curing the objects, washing the object, trimming support structures from the objects, etc. The objects can remain attached to their respective build platforms during post-processing, such that the build platforms are used to support and/or manipulate the objects during post-processing. In some embodiments, the process of block 1308 involves placing the build platforms with the attached objects into one or more post-processing devices, such as centrifuges, solvent baths, post-curing ovens, furnaces, etc. The indi-vidual build platforms can be sufficiently small to fit within the post-curing device(s). For instance, each build platform can have an area no greater than 1000 cm$^2$, 900 cm$^2$, 800 cm$^2$, 700 cm$^2$, 600 cm$^2$, 500 cm$^2$, 400 cm$^2$, 300 cm$^2$, 200 cm$^2$, or 100 cm$^2$.

At block 1310, the method 1300 can include separating the plurality of objects from the respective build platforms. The separation can be performed using physical techniques, such as scraping, peeling, fracturing sacrificial portions of the objects, etc. Optionally, in embodiments where the build platform include an interface layer between the surface of the build platform and the objects (e.g., as described above in connection with FIG. 12), the separation can be per-formed by disintegrating, destabilizing, or otherwise remov-ing the interface layer via physical and/or chemical tech-niques (e.g., scraping, peeling, dissolving, melting, etching). The separated objects can be subjected to additional post-processing and/or prepared for packaging and shipment. In some embodiments, the build platforms are reassembled onto the carrier for reuse in a subsequent additive manufac-turing operation.

The method 1300 illustrated in FIG. 13 can be modified in many different ways. For example, the ordering of the processes shown in FIG. 13 can be varied. Some of the processes of the method 1300 can be omitted and/or the method 1300 can include additional processes not shown in FIG. 13. For instance, the method 1300 can further include coupling a prefabricated element to at least one build platform, such that the prefabricated element becomes part of the object(s) formed on that build platform (e.g., as described above in connection with FIGS. 11A-11H).

FIG. 14 is a flow diagram illustrating a method 1400 for fabricating additively manufactured objects, in accordance with embodiments of the present technology. The method 1400 can be performed by any of the systems and devices described herein, such as any of the embodiments of FIGS. 1-12. In some embodiments, some or all of the processes of the method 1400 are implemented as computer-readable instructions (e.g., program code) that are configured to be executed by one or more processors of a computing device, such as a controller of an additive manufacturing system and/or a post-processing system. The method 1400 can be combined with any of the other methods described herein, such as the method 100 of FIG. 1 and/or the method 1300 of FIG. 13.

The method 1400 can begin at block 1402, in which a 3D printer comprising a carrier and a plurality of build platforms releasably fixed on the carrier is provided. One or more of the build platforms can define a build plane for building at least one 3D object thereon. The 3D printer may include a light engine for selectively curing layers of a light-polymerizable resin on the build platforms.

At block 1404, a prefabricated element can be placed and/or mounted onto the build platform or into a recess of the build platform, and at least one of the layers of light-polymerizable resin is bonded to the prefabricated element during the printing of the 3D object.

At block 1406, a plurality of 3D objects are built with the 3D printer. At least one of said plurality of 3D objects can be built on each build platform.

At block 1408, the build platforms can be removed with said at least one 3D object placed thereon from the 3D printer.

At block 1410, the 3D objects, while being arranged on their respective build platform, can be subjected to at least one post-processing step after the build platforms have been separated from the carrier.

The method 1400 illustrated in FIG. 14 can be modified in many different ways. For example, the ordering of the processes shown in FIG. 14 can be varied. Some of the processes of the method 1400 can be omitted (e.g., the process of block 1404) and/or the method 1400 can include additional processes not shown in FIG. 14.

III. Dental Appliances and Associated Methods

Figure 15A:
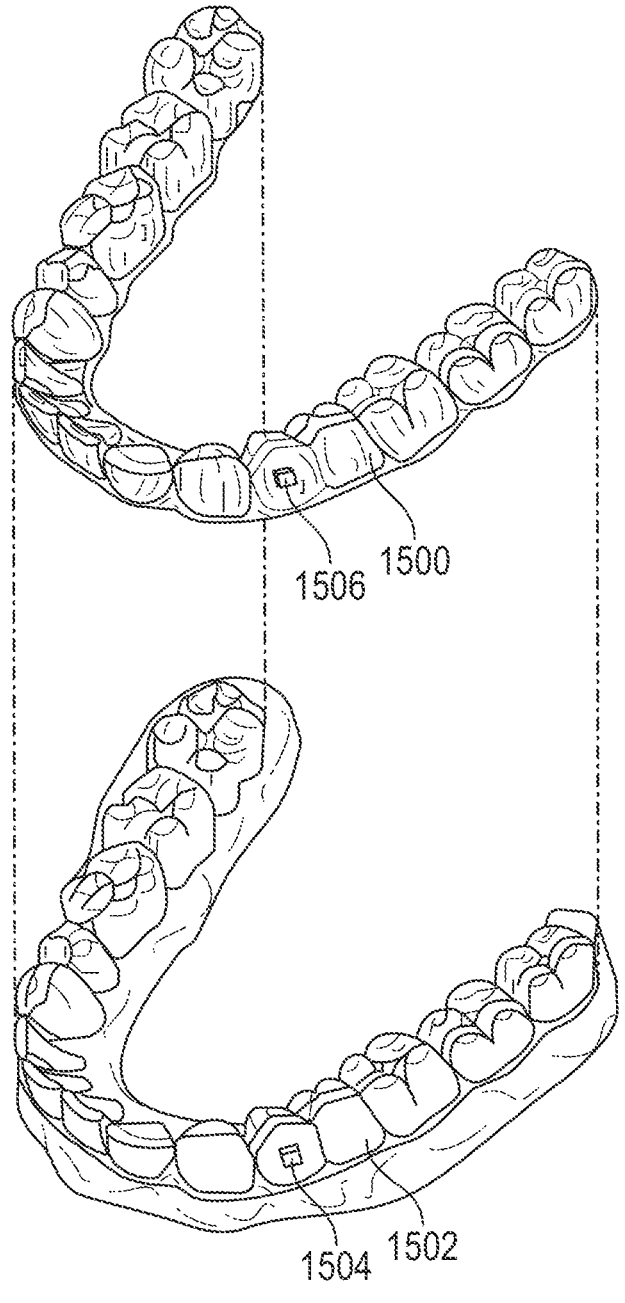
FIG. 15A illustrates a representative example of a tooth repositioning appliance configured in accordance with embodiments of the present technology.

FIG. 15A illustrates a representative example of a tooth repositioning appliance 1500 configured in accordance with embodiments of the present technology. The appliance 1500 can be manufactured using any of the systems, methods, and devices described herein. The appliance 1500 (also referred to herein as an "aligner") can be worn by a patient in order to achieve an incremental repositioning of individual teeth 1502 in the jaw. The appliance 1500 can include a shell (e.g., a continuous polymeric shell or a segmented shell) having teeth-receiving cavities that receive and resiliently reposition the teeth. The appliance 1500 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 1500 can fit over all teeth present in an upper or lower jaw, or less than all of the teeth. The appliance 1500 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 1500 can be a generic appliance configured to receive the teeth, but not necessarily shaped to match the topography of the patient's teeth. In some cases, only certain teeth received by the appliance 1500 are repositioned by the appliance 1500 while other teeth can provide a base or anchor region for holding the appliance 1500 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In some embodiments, no wires or other means are provided for holding the appliance 1500 in place over the teeth. In some cases, however, it may be desirable or necessary to provide individual attachments 1504 or other anchoring elements on teeth 1502 with corresponding receptacles 1506 or apertures in the appliance 1500 so that the appliance 1500 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 15B:
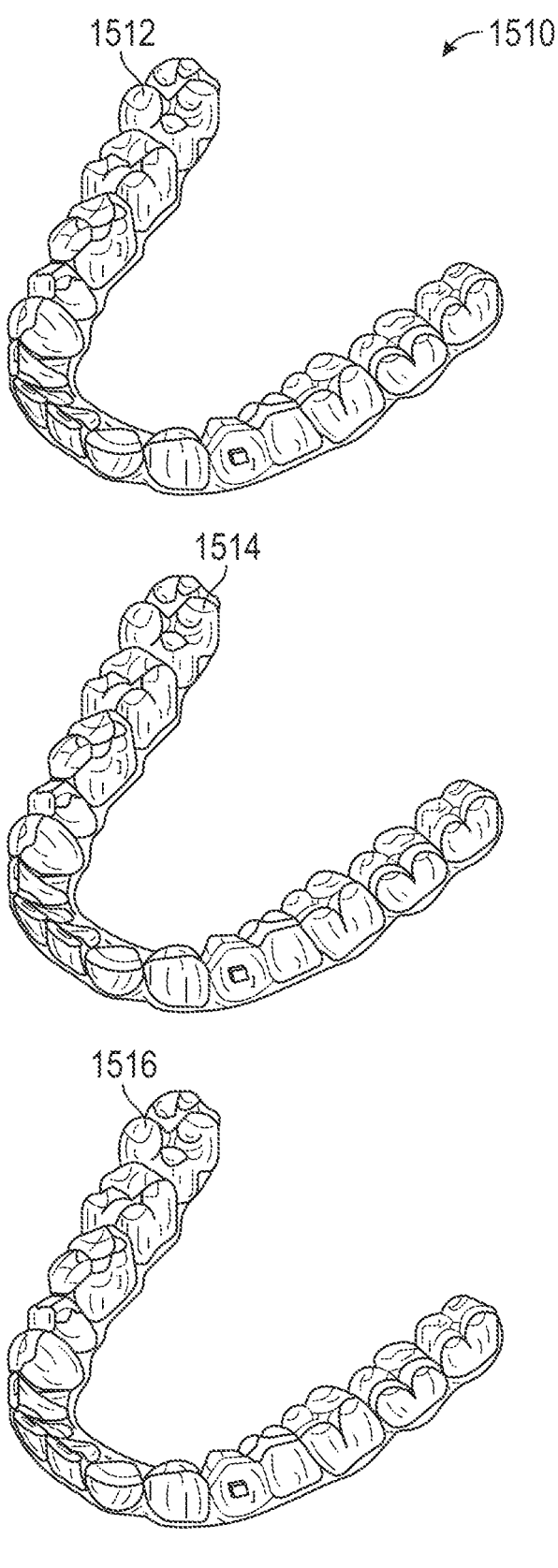
FIG. 15B illustrates a tooth repositioning system including a plurality of appliances, in accordance with embodiments of the present technology.

FIG. 15B illustrates a tooth repositioning system 1510 including a plurality of appliances 1512, 1514, 1516, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1510 can include a first appliance 1512 corresponding to an initial tooth arrangement, one or more intermediate appliances 1514 corresponding to one or more intermediate arrangements, and a final appliance 1516 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

FIG. 15C illustrates a method 1520 of orthodontic treatment using a plurality of appliances, in accordance with embodiments of the present technology. The method 1520 can be practiced using any of the appliances or appliance sets described herein. In block 1522, a first orthodontic appliance is applied to a patient's teeth in order to reposition the teeth from a first tooth arrangement to a second tooth arrangement. In block 1524, a second orthodontic appliance is applied to the patient's teeth in order to reposition the teeth from the second tooth arrangement to a third tooth arrangement. The method 1520 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 16 illustrates a method 1600 for designing an orthodontic appliance, in accordance with embodiments of the present technology. The method 1600 can be applied to any embodiment of the orthodontic appliances described herein. Some or all of the steps of the method 1600 can be performed by any suitable data processing system or device, e.g., one or more processors configured with suitable instructions.

In block 1602, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1604, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, block 1604 can involve determining a particular type of force to be applied (e.g., extrusive force, intrusive force, translational force, rotational force, tipping force, torquing force, etc.) without calculating the specific magnitude and/or direction of the force.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 1606, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systemes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1608, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 1600 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 1600 may be performed with any suitable fabrication system or device, such as the embodiments described herein. Some of the steps may be optional, e.g., the process of block 1604 can be omitted, such that the orthodontic appliance is designed based on the desired tooth movements and/or determined tooth movement path, rather than based on a force system. Moreover, the order of the steps can be varied as desired.

Figure 17:
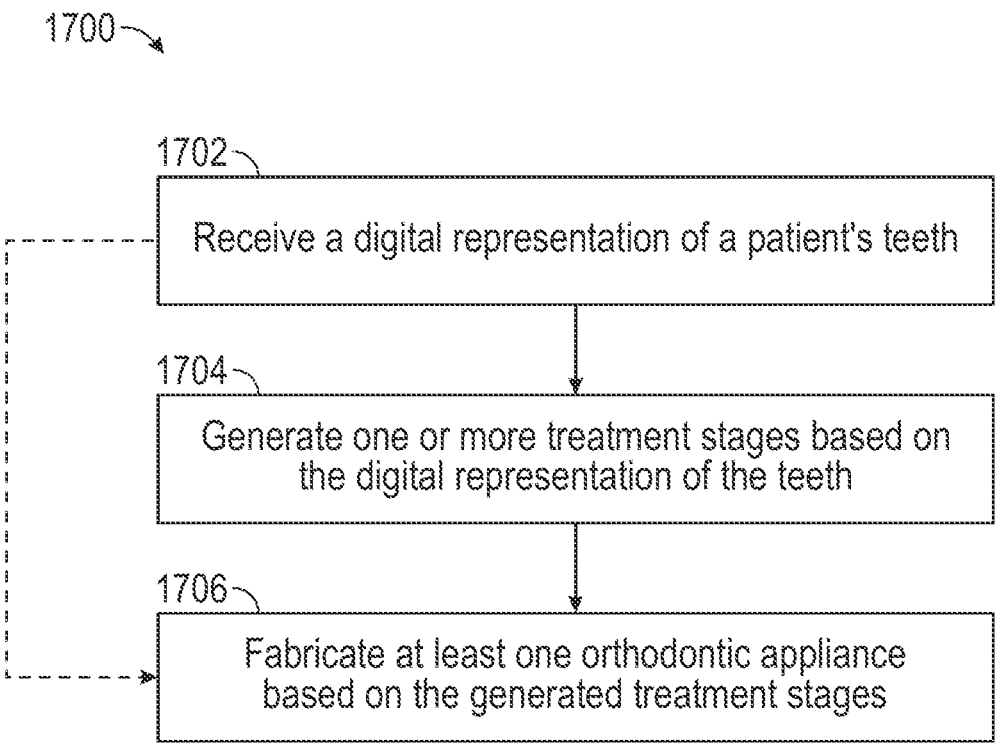
FIG. 17 illustrates a method for digitally planning an orthodontic treatment and/or design or fabrication of an appliance, in accordance with embodiments of the present technology.

FIG. 17 illustrates a method 1700 for digitally planning an orthodontic treatment and/or design or fabrication of an appliance, in accordance with embodiments. The method 1700 can be applied to any of the treatment procedures described herein and can be performed by any suitable data processing system.

In block 1702 a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1704, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1706, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 17, design and/or fabrication of an orthodontic appliance, and perhaps a particular orthodontic treatment, may include use of a representation of the patient's teeth (e.g., including receiving a digital representation of the patient's teeth (block 1702)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537, 406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement devices, e.g., appliances used to position prefabricated attachments on a person's teeth in accordance with one or more aspects of a treatment plan. Examples of attachment placement devices (also known as "attachment placement templates" or "attachment fabrication templates") can be found at least in: U.S. application Ser. No. 17/249,218, entitled, "Flexible 3D Printed Orthodontic Device," filed Feb. 24, 2021; U.S. application Ser. No. 16/366,686, entitled, "Dental Attachment Placement Structure," filed Mar. 27, 2019; U.S. application Ser. No. 15/674,662, entitled, "Devices and Systems for Creation of Attachments," filed Aug. 11, 2017; U.S. Pat. No. 11,103, 330, entitled, "Dental Attachment Placement Structure," filed Jun. 14, 2017; U.S. application Ser. No. 14/963,527, entitled, "Dental Attachment Placement Structure," filed Dec. 9, 2015; U.S. application Ser. No. 14/939,246, entitled, "Dental Attachment Placement Structure," filed Nov. 12, 2015; U.S. application Ser. No. 14/939,252, entitled, "Dental Attachment Formation Structures," filed Nov. 12, 2015; and U.S. Pat. No. 9,700,385, entitled, "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled, "Releasable Palatal Expanders," filed Apr. 10, 2019; U.S. application Ser. No. 16/022,552, entitled, "Devices, Systems, and Methods for Dental Arch Expansion," filed Jun. 28, 2018; U.S. Pat. No.

11,045,283, entitled, "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled, "Methods and Apparatuses for Customizing a Rapid Palatal Expander," filed Dec. 4, 2017; and U.S. Pat. No. 7,192,273, entitled, "System and Method for Palatal Expansion," filed Aug. 7, 2003; all of which are incorporated by reference herein in their entirety.

Examples

The following examples are included to further describe some aspects of the present technology, and should not be used to limit the scope of the technology.

Example 1. A method for manufacturing dental appliances, the method comprising:
coupling a plurality of build platforms to a carrier;
forming a plurality of 3D objects on the plurality of build platforms from a curable material using a lithography-based additive manufacturing process, wherein each build platform receives at least one 3D object thereon;
removing the plurality of build platforms from the carrier after the lithography-based additive manufacturing process;
performing post-processing of the plurality of 3D objects while the 3D objects remain on the respective build platforms; and separating the plurality of 3D objects from the respective build platforms after the post-processing.

Example 2. The method of Example 1, wherein the plurality of build platforms are releasably coupled to the carrier via one or more of the following: a vacuum, mechanical fixation, electromagnetic fixation, or magnetic fixation.

Example 3. The method of Example 1 or 2, wherein, when coupled to the carrier, the plurality of build platforms collectively define a build plane having an area of at least 2000 cm².

Example 4. The method of any one of Examples 1 to 3, wherein the curable material comprises a polymerizable resin.

Example 5. The method of any one of Examples 1 to 4, wherein the lithography-based additive manufacturing process comprises:
bringing the curable material into contact with each build platform, and selectively applying energy to the curable material to form a cured material layer on each build platform.

Example 6. The method of any one of Examples 1 to 5, wherein the curable material is supported on a carrier film.

Example 7. The method of any one of Examples 1 to 6, wherein the curable material is contained within a reservoir.

Example 8. The method of any one of Examples 1 to 7, wherein the post-processing comprises one or more of removing residual curable material from the plurality of 3D objects, washing the plurality of 3D objects in a solvent, or post-curing the plurality of 3D objects.

Example 9. The method of any one of Examples 1 to 8, wherein performing the post-processing comprises placing at least one build platform with the respective at least one 3D object into a centrifuge, solvent bath, or post-curing oven.

Example 10. The method of any one of Examples 1 to 9, further comprising applying an interface layer to each build platform before forming the plurality of 3D objects, wherein the plurality of 3D objects are separated from the respective build platforms by removing the interface layer from each build platform.

Example 11. The method of any one of Examples 1 to 10, further comprising coupling a prefabricated element to at least one build platform, wherein the prefabricated element is integrated into the at least one 3D object received by the at least one build platform during the additive manufacturing process.

Example 12. The method of any one of Examples 1 to 11, wherein the plurality of 3D objects comprise a plurality of dental appliances.

Example 13. The method of any one of Examples 1 to 12, wherein, when coupled to the carrier, the plurality of build platforms collectively define a build plane having a maximum vertical deviation less than or equal to 300 μm.

Example 14. A system for manufacturing 3D objects, the system comprising:

a modular build substrate comprising:

a carrier, and a plurality of build platforms releasably coupled to the carrier;

a printer assembly configured to receive the modular build substrate, wherein the printer assembly comprises:

a source of a curable material, and an energy source configured to output energy toward the curable material to form a plurality of 3D objects on the plurality of build platforms of the modular build substrate according to a lithography-based additive manufacturing process, wherein each build platform of the modular build substrate receives at least one 3D object; and at least one post-processing device configured to perform at least one post-processing operation on the plurality of 3D objects while the 3D objects remain on the respective build platforms and while the respective build platforms are separated from the carrier.

Example 15. The system of Example 14, wherein the plurality of build platforms are releasably coupled to the carrier via one or more of the following: a vacuum, mechanical fixation, electromagnetic fixation, or magnetic fixation.

Example 16. The system of Example 14 or 15, wherein, when coupled to the carrier, the plurality of build platforms collectively define a build plane having an area of at least 2000 cm$^2$.

Example 17. The system of any one of Examples 14 to 16, further comprising a stationary base, wherein the carrier of the modular build substrate is releasably coupled to the base.

Example 18. The system of any one of Examples 14 to 17, wherein the curable material comprises a polymerizable resin.

Example 19. The system of any one of Examples 14 to 18, wherein the printer assembly comprises a carrier film configured to convey a layer of the curable material toward the modular build substrate.

Example 20. The system of Example 19, wherein the printer assembly is configured to move relative to the plurality of build platforms while the energy source outputs energy toward the layer of curable material.

Example 21. The system of any one of Examples 14 to 20, wherein the source of the curable material comprises a reservoir of the curable material, and the modular build substrate is positioned within the reservoir.

Example 22. The system of any one of Examples 14 to 21, wherein the at least one post-processing device comprises one or more of a centrifuge, a solvent bath, or a post-curing oven.

Example 23. The system of any one of Examples 14 to 22, wherein the plurality of 3D objects comprise a plurality of dental appliances.

Example 24. The system of any one of Examples 14 to 23, wherein, when coupled to the carrier, the plurality of build platforms collectively define a build plane having a maximum vertical deviation less than or equal to 300 μm.

Example 25. A method of producing a plurality of 3D objects by lithography based additive manufacturing, comprising:

providing a 3D printer comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms;

building a plurality of 3D objects with the 3D printer, wherein at least one of said plurality of 3D objects is built on each build platform;

removing the build platforms with said at least one 3D object placed thereon from the 3D printer; and subjecting the 3D objects, while being arranged on their respective build platform, to at least one post-processing step after the build platforms have been separated from the carrier.

Example 26. Method according to Example 25, wherein the post-processing step is selected from removing uncured resin, e.g., by centrifuging the 3D object, by washing with fluids, removing solvents from the 3D object, subjecting the 3D object to pressured air, drying the 3D object, removing support structures from the 3D object, removing the 3D object from the build platform, post-curing the 3D object by means of UV-light, and/or heat-curing and/or microwave-curing the 3D object.

Example 27. Method according to Example 25 or 26, wherein an interface layer is each arranged on the build platforms and the 3D objects are built on top of the interface layer, and wherein the at least one post-processing step comprises destabilizing, eliminating, or removing the interface layer, such as by means of dissolving, etching, melting, or other chemical or physical means, thereby causing the 3D object to be detached from the build platform.

Example 28. Method according to any one of Examples 25 to 27, wherein a film is each arranged on the build platforms and the 3D objects are built on top of the film, and wherein the at least one post-processing step comprises peeling the film off from the build platform, thereby detaching the 3D object from the build platform.

Example 29. Method according to any one of Examples 25 to 28, wherein, before building the 3D object, a prefabricated element is placed and/or mounted onto the build platform or into a recess of the build platform and at least one of the layers of light-polymerizable resin is bonded to the prefabricated element during the printing of the 3D object.

Example 30. Method according to any one of Examples 25 to 29, wherein the 3D object is built on the building platform layer-by-layer to obtain a stack of structured layers, wherein each structured layer is obtained by the steps of:

providing an unstructured layer of light-polymerizable resin, and selectively projecting light onto the unstructured layer according to a desired pattern, thereby curing the light-polymerizable resin to obtain the structured layer that is structured according to the pattern.

Example 31. Method according to any one of Examples 25 to 30, wherein at least one of the light engine and the carrier is driven for relative movement to one another while selectively curing a layer of the light-polymerizable resin, so that an exposure field of the light engine sweeps across said plurality of build platforms.

Example 32. Method according to Example 31, wherein the light engine is configured for the dynamic patterning of light in the exposure field of said light engine, wherein pattern data is fed to the light engine so that a light pattern is scrolled in the exposure field at a rate that corresponds to the relative movement speed of the light engine and the carrier.

Example 33. A 3D printer for carrying out a method according to any one of Examples 25 to 32, comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms.

Example 34. 3D printer according to Example 33, wherein fixing means are provided for fixing the position and/or orientation of the build platforms on the carrier, the fixing means preferably being selected from mechanical clamping means, electromagnetic holding means, magnetic holding means, vacuum means and form-fit engagement means.

Example 35. 3D printer according to Example 33 or 34, wherein at least one of the light engine and the carrier is driven for relative movement to one another while selectively curing a layer of the light-polymerizable resin, for an exposure field of the light engine to sweep across said plurality of build platforms.

Example 36. 3D printer according to any one of Examples 33 to 35, further comprising means for applying an unstructured layer of light-polymerizable resin onto the build platform or on the partially built object, wherein the light engine is designed for the patterning of light onto the unstructured layer of light-polymerizable resin, said light engine being adapted to cure the light-polymerizable resin to obtain the structured layer that is structured according to the pattern.

Example 37. 3D printer according any one of Examples 33 to 36, wherein the light engine is designed for the dynamic patterning of light in the exposure field of said light engine, wherein pattern data is fed to the light engine so that a light pattern is scrolled in the exposure field at a rate that corresponds to the relative movement speed of the light engine and the carrier.

Example 38. A 3D printing system comprising:
a 3D printer comprising:
    a carrier,
    a plurality of build platforms releasably fixed on the carrier, wherein each build platform defines a build plane for building at least one 3D object thereon, and
    a light engine for selectively curing layers of light-polymerizable resin on the build platform; and
a post-processing device operative to perform one or more post-processing operations on the 3D objects while arranged on their build platforms and after the build platforms have been separated from the carrier.

Example 39. A method of producing a plurality of 3D objects by lithography based additive manufacturing, comprising:
providing a 3D printer comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms;

building a plurality of 3D objects with the 3D printer, wherein at least one of said plurality of 3D objects is built on each build platform;
removing the build platforms with said at least one 3D object placed thereon from the 3D printer; and
subjecting the 3D objects, while being arranged on their respective build platform, to at least one post-processing operation after the build platforms have been separated from the carrier.

Example 40. Method according to Example 39, wherein the post-processing operation is selected from removing uncured resin, e.g. by centrifuging the 3D object, by washing with fluids, removing solvents from the 3D object, subjecting the 3D object to pressured air, drying the 3D object, removing support structures from the 3D object, removing the 3D object from the build platform, post-curing the 3D object by UV-light, and/or heat-curing and/or microwave-curing the 3D object.

Example 41. Method according to Example 39 or 40, wherein an interface layer is each arranged on the build platforms and the 3D objects are built on top of the interface layer, and wherein the at least one post-processing operation comprises destabilizing, eliminating, or removing the interface layer, such as by dissolving, etching, melting, or other chemical or physical techniques, thereby causing the 3D object to be detached from the build platform.

Example 42. Method according to any one of Examples 39 to 41, wherein a film is each arranged on the build platforms and the 3D objects are built on top of the film, and wherein the at least one post-processing operation comprises peeling the film off from the build platform, thereby detaching the 3D object from the build platform.

Example 43. Method according to any one of Examples 39 to 42, wherein, before building the 3D object, a prefabricated element is placed and/or mounted onto the build platform or into a recess of the build platform and at least one of the layers of light-polymerizable resin is bonded to the prefabricated element during the printing of the 3D object.

Example 44. Method according to any one of Examples 39 to 43, wherein the 3D object is built on the building platform layer-by-layer to obtain a stack of structured layers, wherein each structured layer is obtained by:
    providing an unstructured layer of light-polymerizable resin, and
    selectively projecting light onto the unstructured layer according to a desired pattern, thereby curing the light-polymerizable resin to obtain the structured layer that is structured according to the pattern.

Example 45. Method according to any one of Examples 39 to 44, wherein at least one of the light engine and the carrier is driven for relative movement to one another while selectively curing a layer of the light-polymerizable resin, so that an exposure field of the light engine sweeps across said plurality of build platforms.

Example 46. Method according to Example 45, wherein the light engine is configured for the dynamic patterning of light in the exposure field of said light engine, wherein pattern data is fed to the light engine so that a light pattern is scrolled in the exposure field at a rate that corresponds to the relative movement speed of the light engine and the carrier.

Example 47. A 3D printer for carrying out a method according to any one of Examples 39 to 46, comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms.

Example 48. 3D printer according to Example 47, wherein a fixing mechanism is provided for fixing the position and/or orientation of the build platforms on the carrier, the fixing mechanism preferably being selected from mechanical clamping mechanisms, electromagnetic holding mechanisms, magnetic holding mechanisms, vacuum mechanisms and form-fit engagement mechanisms.

Example 49. 3D printer according to Example 47 or 48, wherein at least one of the light engine and the carrier is driven for relative movement to one another while selectively curing a layer of the light-polymerizable resin, for an exposure field of the light engine to sweep across said plurality of build platforms.

Example 50. 3D printer according to any one of Examples 47 to 49, further comprising a device for applying an unstructured layer of light-polymerizable resin onto the build platform or on the partially built object, wherein the light engine is designed for the patterning of light onto the unstructured layer of light-polymerizable resin, said light engine being adapted to cure the light-polymerizable resin to obtain the structured layer that is structured according to the pattern.

Example 51. 3D printer according any one of Examples 47 to 50, wherein the light engine is designed for the dynamic patterning of light in the exposure field of said light engine, wherein pattern data is fed to the light engine so that a light pattern is scrolled in the exposure field at a rate that corresponds to the relative movement speed of the light engine and the carrier.

Example 52. A system comprising:
a vat arranged to hold a curable material;
a resin delivery device arranged to deliver the curable material from the vat;
a modular build substrate including:
   a carrier having a planar substrate, and
   a plurality of removable build platforms coupled to the planar substrate, wherein one or more removable build platforms of the plurality of removable build platforms are arranged to receive deposited curable material from the resin delivery device; and
a light engine operative to provide light to cure the deposited curable material on the one or more removable build platforms and to form a plurality of 3D objects on the one or more removable build platforms.

Example 53. The system of Example 52, wherein the light engine dynamically patterns the light toward the deposited curable material.

Example 54. The system of Example 52 or 53, further comprising a controller coupled to the light engine, wherein the controller is configured to instruct the light engine to dynamically pattern the light toward the deposited curable material.

Example 55. The system of any one of Examples 52 to 54, further comprising a controller coupled to the light engine, wherein the controller is configured to instruct the resin delivery device to deliver the curable material from the vat.

Example 56. The system of any one of Examples 52 to 55, wherein the resin delivery device comprises a carrier film.

Example 57. The system of any one of Examples 52 to 56, wherein the resin delivery device comprises a rotating carrier film shaped to continuously deliver the curable material from the vat.

Example 58. The system of any one of Examples 52 to 57, further comprising one or more attachment devices to releasably couple the one or more removable build platforms to the planar substrate.

Example 59. The system of any one of Examples 52 to 58, further comprising one or more attachment devices to releasably couple the one or more removable build platforms to the planar substrate, wherein the one or more attachment devices comprises: a vacuum, a mechanical fixation device, an electromagnetic fixation device, a magnetic fixation device, or combination thereof.

Example 60. The system of any one of Examples 52 to 59, wherein the curable material comprises a single resin for making the plurality of 3D objects.

Example 61. The system of any one of Examples 52 to 60, wherein the one or more removable build platforms comprise a single region to receive the deposited curable material.

Example 62. The system of any one of Examples 52 to 61, wherein the one or more removable build platforms are not segmented into distinct regions.

Example 63. The system of any one of Examples 52 to 62, wherein the curable material comprises a single resin for making the 3D object, and the one or more removable build platforms comprise a single region to receive a single resin.

Example 64. The system of any one of Examples 52 to 63, further comprising at least one post-processing device configured to perform at least one post-processing operation on the plurality of 3D objects while the plurality of 3D objects remain on the one or more removable build platforms.

Example 65. The system of any one of Examples 52 to 64, further comprising at least one post-processing device configured to perform at least one post-processing operation on the plurality of 3D objects while the plurality of 3D objects remain on the one or more removable build platforms after the one or more removable build platforms are separated from the carrier.

Example 66. The system of any one of Examples 52 to 65, wherein the plurality of 3D objects comprise a plurality of dental appliances.

Example 67. The system of any one of Examples 52 to 66, wherein the plurality of 3D objects comprise a plurality of aligners to move a person's teeth from an initial arrangement toward a target arrangement.

Example 68. The system of any one of Examples 52 to 67, wherein the plurality of 3D objects comprise a series of aligners to move a person's teeth from an initial arrangement toward a target arrangement according to a plurality of stages of a treatment plan.

Example 69. A system for manufacturing 3D objects, the system comprising:
a vat arranged to hold a curable material;
a resin delivery device arranged to deliver the curable material from the vat;
a modular build substrate including:
   a carrier having a planar substrate, and
   a plurality of removable build platforms coupled to the planar substrate, wherein one or more removable build platforms of the plurality of removable build platforms comprise means for receiving deposited curable material from the resin delivery device; and
a light engine operative to provide light to cure the deposited curable material on the one or more removable build platforms and to form a plurality of 3D objects on the one or more removable build platforms.

Example 70. The system of Example 69, wherein the curable material comprises a single resin for making the plurality of 3D objects.

Example 71. The system of Example 69, wherein the one or more removable build platforms comprise a single region to receive the deposited curable material.

Example 72. The system of Example 69, wherein the curable material comprises a single resin for making the plurality of 3D objects, and the removable build platforms comprise a single region to receive a single resin.

Example 73. A system comprising:
a modular build substrate including a carrier having a planar substrate and one or more regions to receive attachment devices to attach a plurality of removable build platforms to the carrier; and
a printer assembly operative to:
deposit curable material on one or more removable build platforms of the plurality of removable build platforms, and
direct energy toward the deposited curable material on the one or more removable build platforms to cure the deposited curable material into one or more layers of 3D objects manufactured on the one or more removable build platforms.

Example 74. The system of Example 73, further comprising the one or more removable build platforms.

Example 75. The system of Examples 73 or 74, further comprising the attachment devices.

Example 76. The system of any one of Examples 73 to 75, further comprising the attachment devices, wherein the attachment devices comprise: a vacuum, a mechanical fixation device, an electromagnetic fixation device, a magnetic fixation device, or a combination thereof.

Example 77. The system of any one of Examples 73 to 76, wherein the curable material comprises a single resin for making the 3D objects.

Example 78. The system of any one of Examples 73 to 77, wherein the one or more removable build platforms comprise a single region to receive the deposited curable material.

Example 79. The system of any one of Examples 73 to 78, wherein the curable material comprises a single resin for making the 3D objects, and the one or more removable build platforms comprise a single region to receive the single resin.

Example 80. The system of any one of Examples 73 to 79, further comprising at least one post-processing device configured to perform at least one post-processing operation on the 3D objects while the 3D objects remain on the respective removable build platforms and while the respective removable build platforms are separated from the carrier.

CONCLUSION

Although many of the embodiments are described above with respect to systems, devices, and methods for manufacturing dental appliances, the technology is applicable to other applications and/or other approaches, such as manufacturing of other types of objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-17.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for manufacturing dental appliances, the method comprising:

coupling a plurality of build platforms to a carrier;

forming a plurality of dental appliances on the plurality of build platforms from a curable material using a lithography-based additive manufacturing process, wherein each build platform receives at least one dental appliance thereon;

removing the plurality of build platforms from the carrier after the lithography-based additive manufacturing process;

performing post-processing of the plurality of dental appliances while the dental appliances remain on the respective build platforms, the post-processing comprising centrifugation of the dental appliances on the respective build platforms, wherein the plurality of build platforms have a stiffness configured to resist bending during the centrifugation; and separating the plurality of dental appliances from the respective build platforms after the post-processing.

2. The method of claim 1, wherein the plurality of build platforms are releasably coupled to the carrier via one or more of the following: a vacuum, mechanical fixation, electromagnetic fixation, or magnetic fixation.

3. The method of claim 1, wherein, when coupled to the carrier, the plurality of build platforms collectively define a build plane having an area of at least 2000 cm$^2$.

4. The method of claim 1, wherein the curable material comprises a polymerizable resin.

5. The method of claim 1, wherein the lithography-based additive manufacturing process comprises:

bringing the curable material into contact with each build platform, and selectively applying energy to the curable material to form a cured material layer on each build platform.

6. The method of claim 1, wherein the curable material is supported on a carrier film.

7. The method of claim 1, wherein the curable material is contained within a reservoir.

8. The method of claim 1, wherein the post-processing comprises one or more of removing residual curable material from the plurality of dental appliances, washing the plurality of dental appliances in a solvent, annealing the plurality of dental appliances, or post-curing the plurality of dental appliances.

9. The method of claim 1, wherein performing the post-processing comprises placing at least one build platform with the respective at least one dental appliance into a centrifuge, solvent bath, annealing oven, or post-curing oven.

10. The method of claim 1, further comprising applying an interface layer to each build platform before forming the plurality of dental appliances, wherein the plurality of dental appliances are separated from the respective build platforms by removing the interface layer from each build platform.

11. The method of claim 1, further comprising coupling a prefabricated element to at least one build platform, wherein the prefabricated element is integrated into the at least one dental appliance received by the at least one build platform during the additive manufacturing process.

12. The method of claim 1, wherein, when coupled to the carrier, the plurality of build platforms collectively define a build plane having a maximum vertical deviation less than or equal to 300 μm.

13. A system for manufacturing dental appliances, the system comprising:

a modular build substrate comprising:

a carrier, and a plurality of build platforms releasably coupled to the carrier;

a printer assembly configured to receive the modular build substrate, wherein the printer assembly comprises:

a source of a curable material, and an energy source configured to output energy toward the curable material to form a plurality of dental appliances on the plurality of build platforms of the modular build substrate according to a lithography-based additive manufacturing process, wherein each build platform of the modular build substrate receives at least one dental appliance; and at least one post-processing device configured to perform at least one post-processing operation on the plurality of dental appliances while the dental appliances remain on the respective build platforms and while the respective build platforms are separated from the carrier, wherein the at least one post-processing device comprises a centrifuge configured for centrifugation of the dental appliances on the respective build platforms, and wherein the plurality of build platforms have a stiffness configured to resist bending during the centrifugation.

14. The system of claim 13, wherein the plurality of build platforms are releasably coupled to the carrier via one or more of the following: a vacuum, mechanical fixation, electromagnetic fixation, or magnetic fixation.

15. The system of claim 13, wherein, when coupled to the carrier, the plurality of build platforms collectively define a build plane having an area of at least 2000 cm$^2$.

16. The system of claim 13, further comprising a stationary base, wherein the carrier of the modular build substrate is releasably coupled to the base.

17. The system of claim 13, wherein the curable material comprises a polymerizable resin.

18. The system of claim 13, wherein the printer assembly comprises a carrier film configured to convey a layer of the curable material toward the modular build substrate.

19. The system of claim 18, wherein the printer assembly is configured to move relative to the plurality of build platforms while the energy source outputs energy toward the layer of curable material.

20. The system of claim 13, wherein the source of the curable material comprises a reservoir of the curable material, and the modular build substrate is positioned within the reservoir.

21. The system of claim 13, wherein the at least one post-processing device comprises one or more of a solvent bath, a dryer, an annealing oven, or a post-curing oven.

22. The system of claim 13, wherein, when coupled to the carrier, the plurality of build platforms collectively define a build plane having a maximum vertical deviation less than or equal to 300 μm.

23. The method of claim 1, wherein the plurality of build platforms comprise recesses configured to allow excess curable material to flow beneath the plurality of build platforms during the lithography-based additive manufacturing process.

24. The method of claim 23, further comprising collecting the excess curable material for reuse in a subsequent lithography-based additive manufacturing process.

* * * * *